United States Patent
Cohen et al.

(10) Patent No.: US 10,478,802 B2
(45) Date of Patent: Nov. 19, 2019

(54) ANTI-FINGERPRINT PHOTOCATALYTIC NANOSTRUCTURE FOR TRANSPARENT SURFACES

(71) Applicants: Robert E. Cohen, Jamaica Plain, MA (US); Michael F. Rubner, Westford, MA (US); Gareth H. McKinley, Acton, MA (US); George Barbastathis, Boston, MA (US); Hyungryul Johnny Choi, Cambridge, MA (US); Kyu Chul Park, Cambridge, MA (US); Hyo Min Lee, Cambridge, MA (US)

(72) Inventors: Robert E. Cohen, Jamaica Plain, MA (US); Michael F. Rubner, Westford, MA (US); Gareth H. McKinley, Acton, MA (US); George Barbastathis, Boston, MA (US); Hyungryul Johnny Choi, Cambridge, MA (US); Kyu Chul Park, Cambridge, MA (US); Hyo Min Lee, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 14/274,642

(22) Filed: May 9, 2014

(65) Prior Publication Data
US 2014/0336039 A1    Nov. 13, 2014

Related U.S. Application Data

(60) Provisional application No. 61/821,286, filed on May 9, 2013.

(51) Int. Cl.
*B01J 21/06* (2006.01)
*B01J 37/02* (2006.01)
(Continued)

(52) U.S. Cl.
CPC .......... *B01J 21/063* (2013.01); *B01J 35/004* (2013.01); *B01J 35/0013* (2013.01);
(Continued)

(58) Field of Classification Search
CPC ..................................................... B01J 21/063
See application file for complete search history.

(56) References Cited

U.S. PATENT DOCUMENTS

2004/0043260 A1*  3/2004  Nadaud et al. ............... 428/701
2007/0092734 A1*  4/2007  Durandeau ........... C23C 16/405
                                                          428/432
(Continued)

FOREIGN PATENT DOCUMENTS

WO    WO-2012027587 A2 *  3/2012  ........... C23C 14/083

OTHER PUBLICATIONS

Janczarek et al., "Hydrophilicity of TiO2 exposed to UV and VIS radiation," Physicochemical Problems of Mineral Processing 40, pp. 287-292, May 2006.*

*Primary Examiner* — Melvin C. Mayes
*Assistant Examiner* — Stefanie J Cohen
(74) *Attorney, Agent, or Firm* — Steptoe & Johnson LLP

(57) ABSTRACT

Titania-based porous nanoparticle coatings are mechanically robust, with low haze, which exhibit short time scales for decomposition of fingerprint oils under ultraviolet light. The mechanism by which a typical dactylogram is consumed combines wicking of the sebum into the nanoporous titania structure followed by photocatalytic degradation. These $TiO_2$ nanostructured surfaces are also anti-fogging, antibacterial, and compatible with flexible glass substrates and remain photocatalytically active in natural sunlight.

11 Claims, 30 Drawing Sheets

(51) Int. Cl.
*B01J 35/00* (2006.01)
*C09D 5/00* (2006.01)
*C03C 17/00* (2006.01)
*C03C 17/34* (2006.01)
*C09D 1/00* (2006.01)
*C09D 5/14* (2006.01)
*C09D 7/61* (2018.01)
*B01J 37/34* (2006.01)

(52) U.S. Cl.
CPC ....... *B01J 37/0217* (2013.01); *B01J 37/0219* (2013.01); *B01J 37/0244* (2013.01); *C03C 17/007* (2013.01); *C03C 17/34* (2013.01); *C09D 1/00* (2013.01); *C09D 5/00* (2013.01); *C09D 5/006* (2013.01); *C09D 5/14* (2013.01); *C09D 7/61* (2018.01); *B01J 37/349* (2013.01); *B01J 2231/70* (2013.01); *C03C 2217/42* (2013.01); *C03C 2217/425* (2013.01); *C03C 2217/477* (2013.01); *C03C 2217/71* (2013.01); *C03C 2217/734* (2013.01); *C03C 2217/75* (2013.01)

(56) References Cited

U.S. PATENT DOCUMENTS

2010/0112359 A1\* 5/2010 Sharma et al. ............... 428/432
2010/0260644 A1\* 10/2010 Day et al. ..................... 422/121

\* cited by examiner

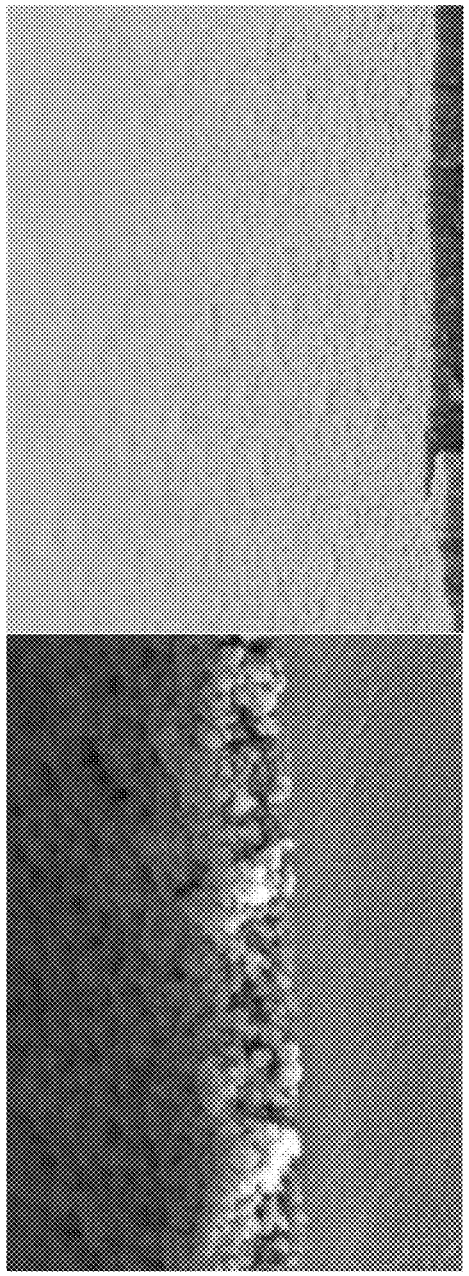
FIG. 16A
FIG. 16B
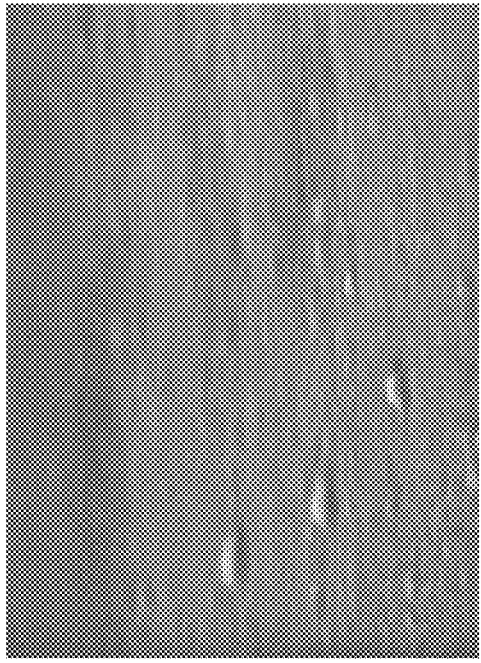
FIG. 16C ental tribal the government has certain rights in the invention.

ANTI-FINGERPRINT PHOTOCATALYTIC NANOSTRUCTURE FOR TRANSPARENT SURFACES

CLAIM OF PRIORITY

This application claims the benefit of prior U.S. Provisional Application No. 61/821,286, filed on May 9, 2013, which is incorporated by reference in its entirety.

STATEMENT REGARDING FEDERALLY SPONSORED RESEARCH OR DEVELOPMENT

This invention was made with government support under Grant No. DMR-0819762 awarded by the National Science Foundation. The government has certain rights in the invention.

TECHNICAL FIELD

This invention relates to anti-fingerprint surfaces.

BACKGROUND

Using fingers to handle objects is one of the unique characteristics of human behaviors. In daily life, people use the fingers of hands to use spoons, forks, cups, pens, to open books, newspapers, to type on computer keyboards, and to control the touch screen of electronic devices. When fingers contact with these surfaces, submillimetric ridges on the epidermis leave a unique pattern referred to generally as a 'fingerprint', made of secreted human sweat or sebum, on the contacting surfaces. These fingerprint films are usually unwanted and removal these oily films from transparent surfaces such as windows, glasses, goggles, touch screens and displays of electronic devices is desirable. Because the micrometric pattern of fingerprint films usually scatters light and results in blurry letters or images behind the optically transparent and distortion free smooth surfaces. There have been several attempts to prevent formation of these dactylograms on glass by employing oil-repellent textured surfaces. However, these textured superoleophobic coatings typically reduce transmissivity of visible light, and the microstructural topography that promotes the super-repellent state is not robust to the typical contact pressures of human fingers.

SUMMARY

In general, an anti-fingerprint surface can include a structure including a transparent substrate and a multi-layer nanoparticle structure residing on the substrate, where the multi-layer structure comprising an outermost layer of titanium dioxide nanoparticles. In one aspect, the outer most layer can be porous. In another aspect, the multi-layer structure can include alternating layers of low and high index of refraction materials to provide broadband anti-reflectivity. In another aspect, the multi-layer structure can include material selected from the group consisting of silicon dioxide, titanium dioxide, silicon, metallic glass, polymer, and/or metal, to provide a selected functionality. The selected functionality can be anti-reflectivity, anti-fogging, anti-scratch, or anti-bacterial.

In another aspect, the substrate of the structure can be flexible. In another embodiment, the nanoparticle size and thickness of the multilayers can be selected to maximize a photocatalytic effect and to minimize light scattering.

In another aspect, the nanoparticles included in the structure can be hydrophilic. The size of nanoparticles can be less than 1 nm.

The porous outermost layer can have a high Wenzel roughness.

In another aspect, oil deposition on the outermost layer of the structure can be degraded after exposure to sunlight or to UV light. The oil deposition can be degraded within 3 hours of exposure to sunlight or UV light.

A method of manufacturing a photocatalytic structure can include preparing a transparent substrate, depositing oppositely charged materials; and depositing titanium dioxide nanoparticles at an outermost layer of the deposited charged materials. The method of manufacturing the structure can further include annealing the structure between 200° C. and 500° C., or hydrothermal treatment of the substrate. In one aspect, the substrate can be flexible. In another aspect, the nanoparticles can be hydrophilic. In another aspect, the nanoparticles can have a diameter of between 1 nm to 50 nm.

Other aspects, embodiments, and features will be apparent from the following description, the drawings, and the claims.

BRIEF DESCRIPTION OF THE DRAWINGS

FIG. 1B is an image after photocatalytic oxidation under UV light.

FIG. 16A-C is a series of SEM micrographs for three different surfaces.

DETAILED DESCRIPTION

Figure 1A:
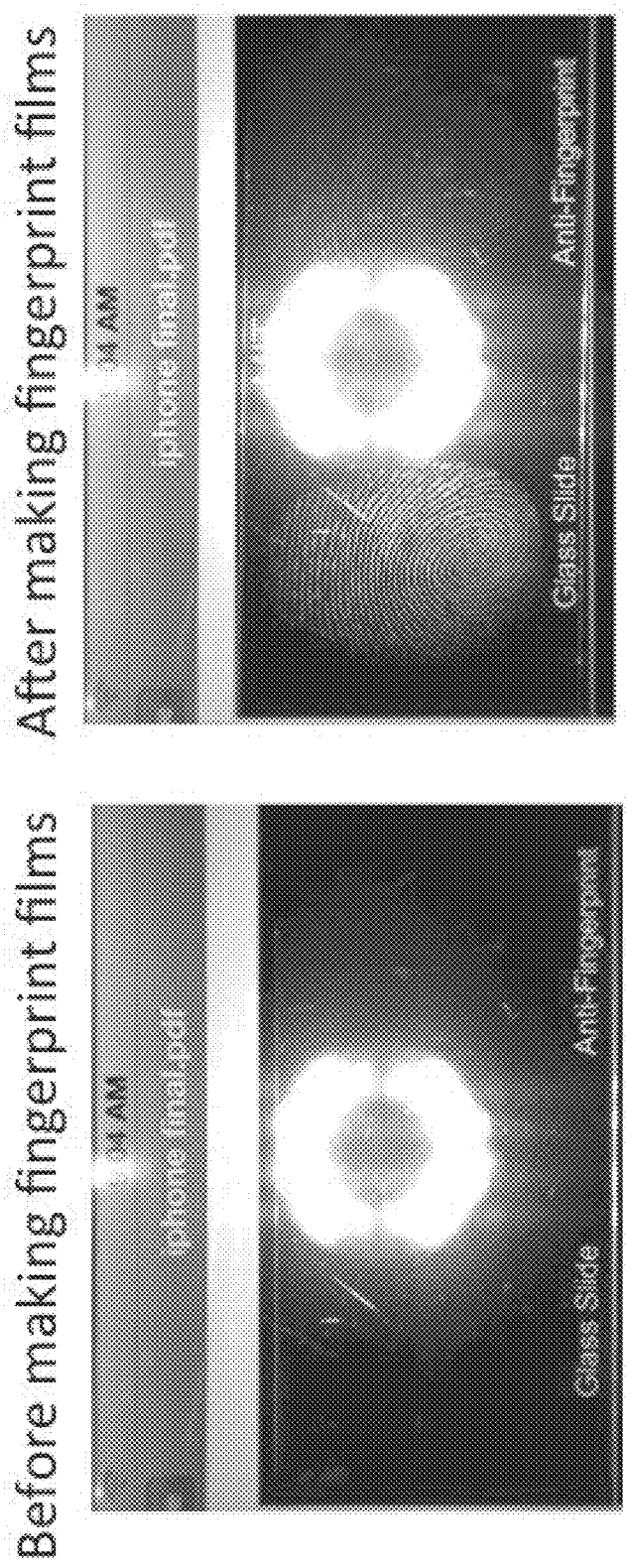
FIG. 1A is an image of initial finger print films.
Figure 5A:
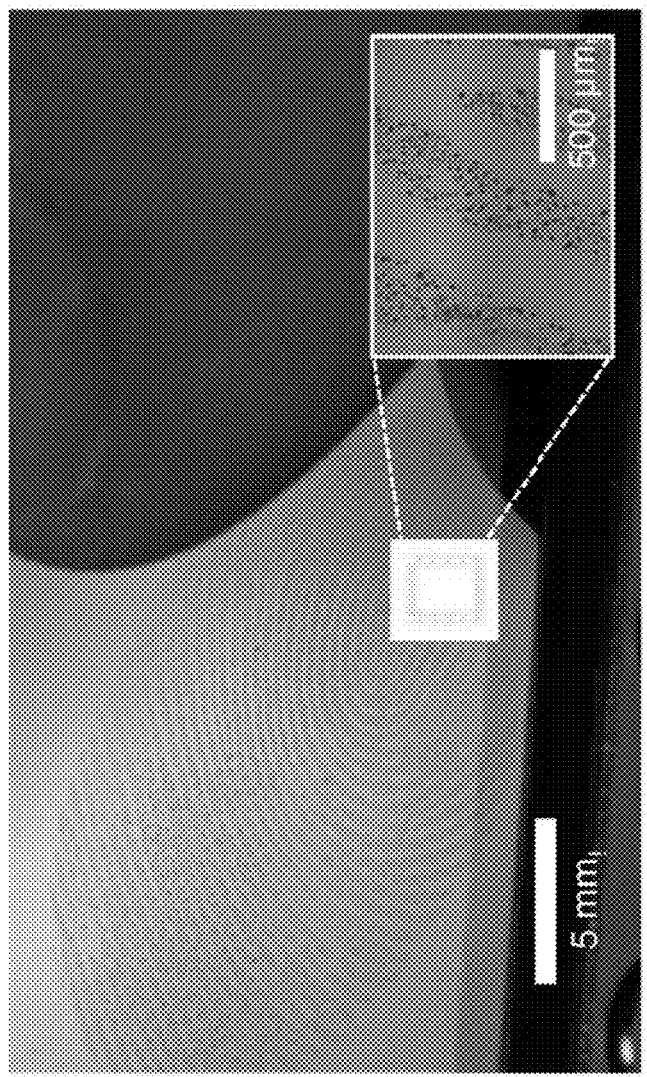
FIG. 5A is an image of fingerprint oils deposited on a touchscreen display. The inset shows a magnified view of the fingerprint oils, which reveals micrometric liquid droplets.

Undesired fingerprint oils (sebum) deposited on transparent surfaces such as the touchscreens of mobile phones and glass displays significantly lower optical transmissivity, hamper visibility, and contaminate flat clean surfaces with dirt and bacteria. Low surface tension sebaceous liquids such as human fingerprint oils are readily deposited on high energy surfaces such as clean glass, leaving smudges that significantly lower transparency and optical transmissivity. See, Scrutont, B., Robins, B. W. & Blott, B. H. The deposition of fingerprint films. *J. Phys. D: Appl. Phys.* 8, 714-723 (1975), Thomas, G. L. & Reynoldson, T. E. Some observations on fingerprint deposits. *J. Phys. D: Appl. Phys.* 8, 724-729 (1975), Mori, K. Photo-functionalized materials using nanoparticles: Photocatalysis. *KONA* 205-214 (2005), Yao, X. et al. Adaptive fluid-infused porous films with tunable transparency and wettability. *Nat. Materials* 12, 529-534 (2013), Wang, G., Wang, H. & Guo, Z. Robust transparent and anti-fingerprint superhydrophobic film. *Chem. Commun.* 49, 7310-7312 (2013), and The global market for anti-fingerprint, anti-bacterial, anti-fouling, easy-to-clean and self-cleaning nanocoatings. (Future Markets, Inc, 2012), each of which is incorporated by reference in its entirety. As shown in FIGS. 1A and 5A, the micrometric pattern of a fingerprint or dactylogram results in reflection and scattering of incident light, and contaminants can easily adhere to the oil-wetted surfaces. Fingerprint oils are secreted from sebaceous glands located on top of the friction ridges that cover the tips of human fingers. See, Mackenna, R. M. B., Wheatley, V. R. & Wormall, A. The composition of the surface skin fat (sebum) from the human forearm. *J. Invest. Dermatol.* 15, 33-47 (1950), which is incorporated by reference in its entirety. The deposited print is predominantly water, but also contains a mixture of organic chemicals such as urea, uric acid, amino acid, ammonia, lipids, glucose and lactic acid resulting in an oily liquid with surface tension $23 < \gamma_{LV} < 60$ mN/m. See, Cheng, J. B. & Russell, D. W. Mammalian wax biosynthesis—II. Expression cloning of wax synthase cDNAs encoding a member of the acyltransferase enzyme family. *J. Biol. Chem.* 279, 37798-37807 (2004), eahich is incorporated by reference in its entirety. Because of this low interfacial tension, previous studies on anti-fingerprint surfaces have mostly focused on developing transparent oil-repellent or superoleophobic surfaces. See, Hikita, M., Tanaka, K., Nakamura, T., Kajiyama, T. & Takahara, A. Super-liquid-repellent surfaces prepared by colloidal silica nanoparticles covered with fluoroalkyl groups. *Langmuir* 21, 7299-7302 (2005), and Wu, L. Y. L, Ngian, S. K., Chen, Z. & Xuan, D. T. T. Quantitative test method for evaluation of anti-fingerprint property of coated surfaces. *Appl. Surf. Sci.* 257, 2965-2969 (2011), each of which is incorporated by reference in its entirety. However, the intrinsic thermodynamic metastability of the composite superoleophobic state can result in failure of the oil repellency under moderate contact pressures. Susceptibility to mechanical damage also limits the utility of such microstructured coatings for preventing fingerprint deposition in practical applications. See, Mascaro, S. A. & Asada, H. H. Measurement of finger posture and three-axis fingertip touch force using fingernail sensors. *IEEE Trans. Robot. Automat.* 20, 26-35 (2004), Parlitz, D., Peschel, T. & Altenmuller, E. Assessment of dynamic finger forces in pianists: Effects of training and expertise. *J. Biomech.* 31, 1063-1067 (1998), Quéré, D. Wetting and roughness. *Annu. Rev. Mater. Res.* 38, 71-99 (2008), Butt, H. J. et al. Design principles for superamphiphobic surfaces. *Soft Matter* 9, 418-428 (2013), Tuteja, A., Choi, W., Mabry, J. M., McKinley, G. H. & Cohen, R. E. Robust omniphobic surfaces. *Proc. Natl. Acad. Sci. U.S.A.* 105, 18200-18205 (2008), Tuteja, A. et al. Designing superoleophobic surfaces. *Science* 318, 1618-1622 (2007), and Deng, X., Mammen, L., Butt, H. J. & Vollmer, D. Candle soot as a template for a transparent robust superamphiphobic coating. *Science* 335, 67-70 (2012), each of which is incorporated by reference in its entirety.

There have been numerous studies on how to prevent the creation of fingerprint film or how to conveniently remove fingerprint oil from surfaces. Two methods have been highlighted for the past decade. The first one is to inhibit the creation of fingerprint films on the surfaces by making sweat- or sebum-repellent surfaces (i.e. superoleophobic or omniphobic surfaces) using the combination of low surface energy chemical coating and special textured structures. However, the liquid-solid-air composite state that enables such super-repellency is thermodynamically metastable. Beyond a critical external perturbation pressure (which creates a pressure difference across the liquid-air interface higher than impalement pressure), the metastable composite state transitions to a globally stable fully-wetted state and super-repellency is no longer recovered until the liquid is fully removed by wiping, washing, evaporation, etc. See, Tuteja, A.; Choi, W.; Ma, M.; Mabry, J. M.; Mazzella, S.; Rutledge, G.; McKinley, G. H.; Cohen, R. E., *Science* 2007, 318, 1618, Tuteja, A.; Choi, W.; Mabry, J.; McKinley, G.; Cohen, R., *PNAS* 2008, 109, 18200, and Butt, H.-J.; Semprebon, C.; Papadopoulos, P.; Vollmer, D.; Brinkmann, M.; Ciccotti, M., *Soft Matter* 2013, 9, 218, each of which is incorporated by reference in its entirety. For a low surface tension oil such as sebum with vanishingly small vapor pressure the barrier to this metastable transition is very small. According to theoretical analysis, the maximum pressure range of superoleophobic surfaces that can be created by nanoparticles with diameter of 100 nm is only around 30 kPa, which is barely sufficient to resist the typical human touch pressures, in consideration of order of magnitude of typical contact area (1 cm$^2$). See, Mascaro, S. A.; Asada, H. H., *IEEE Transactions on Robotics and Automation* 2004, 20, 26, and Parlitz, D.; Peschel, T.; Altenmüller, E., *Journal of Biomechanics* 1998, 31, 1063, each of which is incorporated by reference in its entirety. Therefore, the intrinsic metastability and finite impalement pressure limit the use of superoleophobic or omniphobic microtextured surfaces for preventing the depositing and spreading of fingerprint films under practical conditions.

The second method exploits the photocatalytic oxidization of titanium dioxide to chemically degrade the deposited fingerprint oils. Two decades ago, Honda and Fujishima unveiled the evolutionary photocatalytic effect that can be applied to environmental science, energy science, etc. See, Hashimoto, K.; Irie, H.; Fujishima, A., *Japanese Journal of Applied Physics* 2005, 44, 8269, and Kozawa, E.; Sakai, H.; Hirano, T.; Kohno, T.; Kakihara, T.; Momozawa, N.; Abe, M., *Journal of Microencapsulation* 2001, 18, 29, each of which is incorporated by reference in its entirety. One of their discoveries is the oxidization of thin organic thin film directly contacting TiO$_2$ layer by photocatalytic effect. Later, this oxidization of thin film was extended to the concept of self-cleaning by photocatalytic effect and has been highlighted as a way of removal of thin fingerprint film. Recently, TiO$_2$ nanoparticles (or porous structure) have been investigated as a more efficient photocatalytic structure than flat TiO$_2$ films.

However, there are few studies on antifingerprint surfaces and they are typically limited to showing microscope images of the surfaces with fingerprint films before and after exposure to light sources. See, Mori, K., *KONA* 2005, 23, 205, which is incorporated by reference in its entirety. Important issues such as change of optical properties (e.g., transparency or haze) of surfaces coated by the titanium dioxide nanoparticle have not been analyzed quantitatively. Moreover, optimal design (e.g., selection of nanoparticle size and thickness of coating layer) and fabrication methods for both (i) maximizing photocatalytic effect to remove fingerprint film by UV light or equivalent amount of sunlight and (ii) minimizing scattering by the stacked nanoparticles layer have not been investigated from the viewpoint of basic interfacial phenomena and optics.

Disclosed herein are optimal designs and coating methods for a transparent fingerprint-eating (or dactylovorous) surface using TiO$_2$ nanoparticle in which the outermost layer maximizes both (i) photocatalytic oxidation effect, leading to the removal of fingerprint oils after several hours under sunlight (FIG. 1) or equivalent UV light sources and (ii) optical transmission of the transparent coated surfaces. With suitable doping material (N, C, S, Pt, Pd, In, etc.), it is also possible to shift operating wavelength to visible light (400-800 nm), keeping high transmission of light through the transparent surfaces. In contrast to previous studies that have targeted an oil repellency mechanism, a counter-intuitive approach was taken of constructing the surfaces from oleophilic materials. This approach uses the combined favorable effects of rapid capillary imbibition (or hemi-wicking) of fingerprint oils into a porous oleophilic titania nanoparticle structure and subsequent photocatalytic decomposition upon exposure to the ultraviolet (UV) component of natural sunlight. Although photocatalytic decomposition using titanium dioxide (TiO$_2$) films has been intensively studied for degrading low molecular weight organic materials into volatile components, studies on multifunctional titania coatings that can achieve practical degradation times (<3 hours under sunlight) whilst also retaining optical transparency in the range of visible light are rare. See, Cebeci, F. Ä., Wu, Z., Zhai, L., Cohen, R. E. & Rubner, M. F. Nanoporosity-driven superhydrophilicity: A means to create multifunctional anti-fogging Coatings. *Langmuir* 22, 2856-2862 (2006); Hashimoto, K., Irie, H. & Fujishima, A. TiO$_2$ photocatalysis: A historical overview and future prospects. *Jpn. J. Appl. Phys.* 44, 8269-8285 (2005), Fujishima, A. & Tryk, D. A. *Functionality of molecular systems Vol.* 2 (Springer Japan, 1999), and Kozawa, E. et al. Photocatalytic activity of TiO$_2$ particulate films prepared by depositing TiO$_2$ particles with various sizes. *J. Microencapsulation* 18, 29-40 (2001), each of which is incorporated by reference in its entirety.

Previous studies and patent disclosures mentioned the photocatalytic effect or thin titania layer for anti-fingerprint. However, they did not claim multilayer TiO$_2$ coating as the outermost coating layer and delve into the optimal nanoparticle size, thickness of the nanoparticle layers, and design & coating methods to maximize photocatalytic effect and optical transmission. As a result, they could not achieve practical level of removal of fingerprint film within a short time (e.g., ~2 hours) under sunlight (5 mW/cm$^2$ for wavelength of 290-390 nm) on transparent substrates. Some of previous inventions included anti-reflectivity but they did not claim other properties such as anti-fogging, anti-bacteria, anti-soot, anti-adhesive, anti-scratch properties that can also be applicable to flexible substrates.

Both high roughness that increases surface area contacting with oxygen & water vapor and the additional oxidization effect by mobile superoxide & hydroxyl radicals enable anti-organic materials including fingerprint film, soot, and adhesives. In addition, permeable structures amplify hydrophilicity, leading to anti-fogging property.

The aforementioned coating methods can be applied to a large area (>1 m$^2$) curved substrate. In particular, LbL coating provides uniform thickness and controlled density of nanoparticle coating that ensures optical transmission by preventing scattering of clustered nanoparticles.

For flexible substrates, nanoparticle coating typically has many defects or cracks that are detrimental to scratch, thus leading to low mechanical durability. However, the technology proposed herein can enhance the scratch resistance by employing hydrothermal treatment.

This technology can be used to produce flexible glass/polymer-based touch screens, touchpads, display of electronics, glasses, goggles, window for buildings and furniture, windshield of any transportation including cars, optical device lens, photovoltaic cells, and bulbs (including LEDs).

Figure 1B:
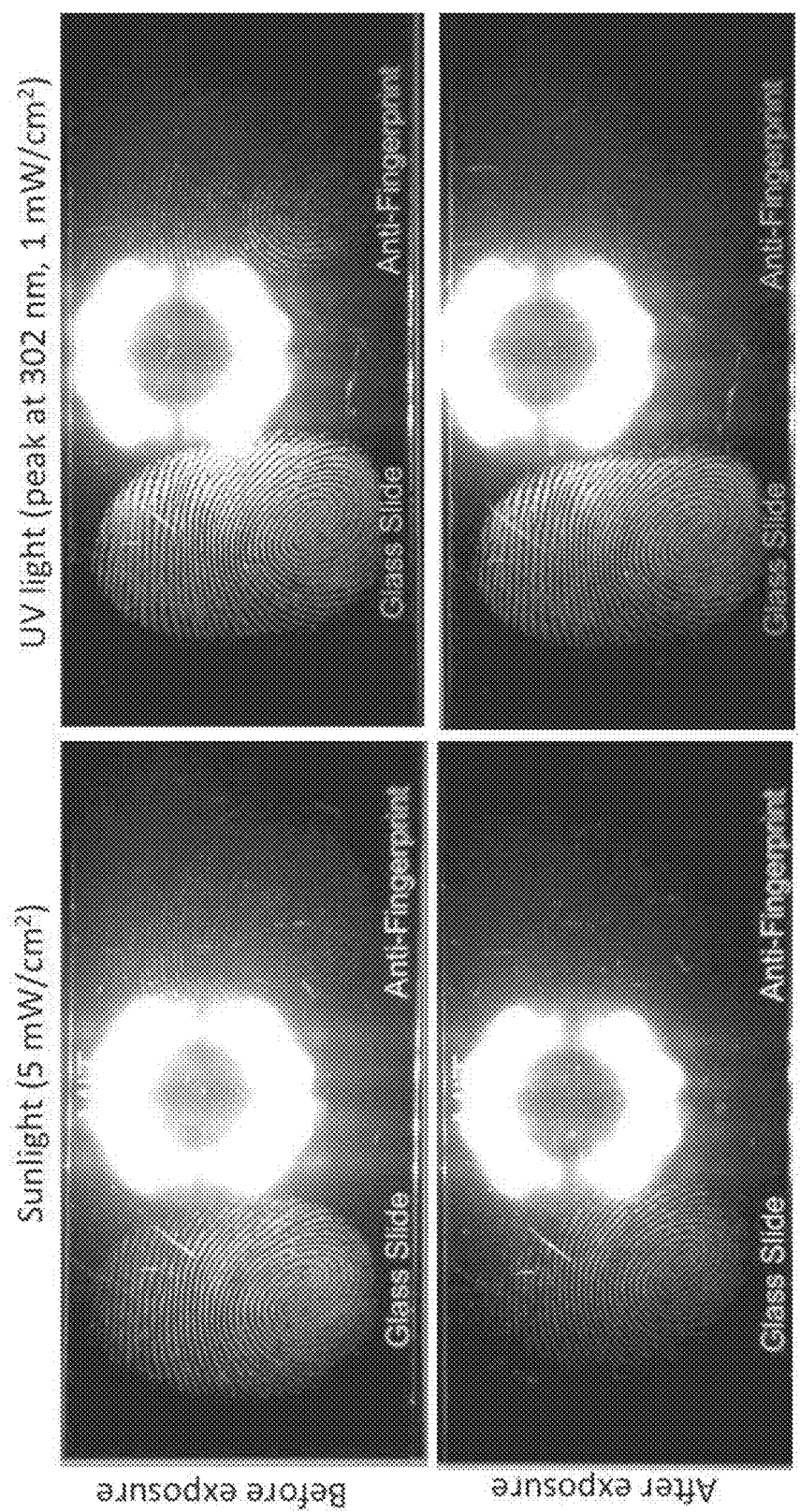
FIG. 1B is an image after photocatalytic oxidation under sunlight.

FIG. 1A shows an image of initial fingerprint films on glass (left) and TiO$_2$ nanoparticle coating (right). FIG. 1B shows the results of photocatalytic oxidation of fingerprint oil under sunlight (3 mW/cm$^2$ for the wavelength of 290-390 nm, for 2.5 hours) and FIG. 1C shows UV light (1 mW/cm$^2$ for the wavelength of 290-390 nm, peak wavelength=302 nm, for 2 hours). All the transparent samples were placed and imaged on top of the touch screen of Apple iPhone 4 that displays white letters "Glass Slide" and "Anti-Fingerprint" on black background. In each image, the left side shows the residual fingerprint oil on normal glass and the right side shows almost nothing on the titania porous nanostructure coating on the same glass. The white circle in the center of each image is the reflection of light emission diode (LED) lamps on the handheld microscope that helps imaging of fingerprint films on both left and right sides.

Figure 2:
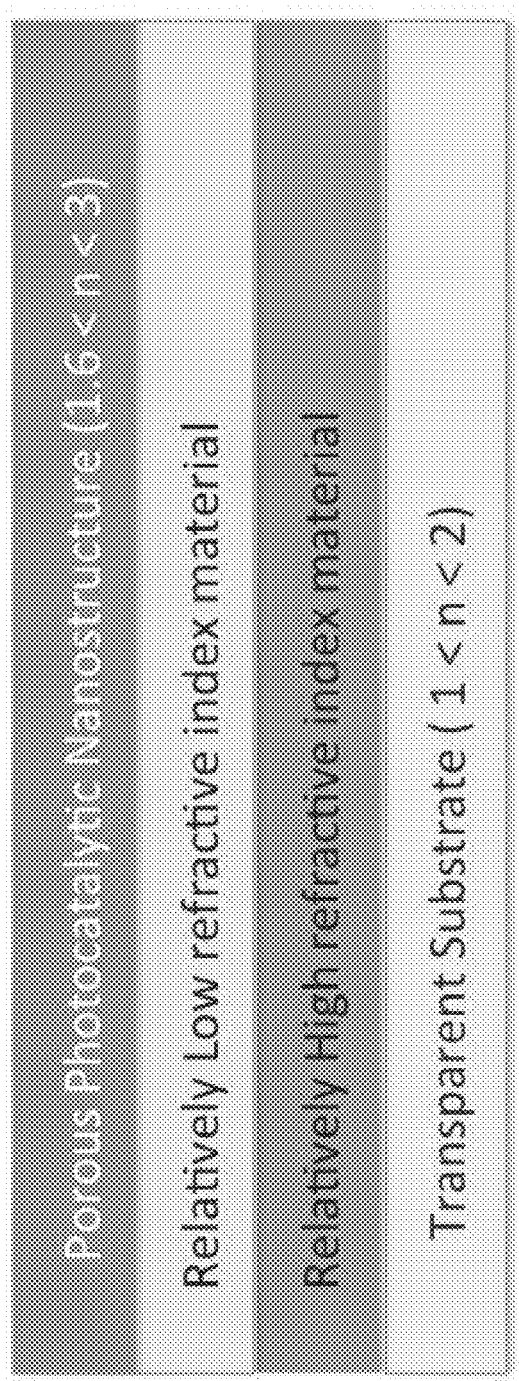
FIG. 2 is a schematic illustration of multilayer coating on transparent substrate.

Apart from the anti-fingerprint function, the proposed nanostructure can show (i) anti-reflection with suitable multilayer coating between the thin titania nanostructure layer and the transparent substrate (FIG. 2), (ii) anti-fogging property through the intrinsic superhydrophilicity of TiO$_2$ nanoparticles, (iii) anti-bacteria property, and (iv) decomposition of other organic materials like carbon soot and transparent adhesive tape (e.g. Scotch tape) using photocatalytic oxidation. The technology can be applied even on a flexible polymeric substrate whose melting temperature or glass transition temperature is below titania annealing temperature (200-550° C.). The mechanical durability (e.g. anti-scratch property) can be significantly enhanced by hydrothermal treatment. See, Gemici, Z.; Shimomura, H.; Cohen, R. E.; Rubner, M. F., Langmuir 2008, 24, 2168, which is incorporated by reference in its entirety.

The nanotextured surfaces proposed herein are comprised of multilayers of nanoparticles with diameter ranging from 1 nm to submicron, any material including titanium dioxide and silicon dioxide deposited on transparent substrate. For maximizing the photocatalytic oxidization effect, the outermost layer of entire coating is designed to be composed of pure titanium dioxide nanoparticles or nanotubes or any porous nanostructure. The thin layers between the outermost titanium dioxide porous structure layer and substrate can be silicon dioxide, titanium dioxide, silicon, metallic glass, polymer, metal, etc. to provide any additional functionalities such as anti-reflectivity, anti-fogging effect, and anti-scratch property, etc.

Functionality Provided by Substrate

The overall flexibility of the anti-fingerprint nanostructured surfaces is provided by the mechanical flexibility of transparent substrate. For a flexible substrate such as graphene oxide/Nafion hybrid film, indium tin oxide (ITO), polyethylene naphthalate (PEN), polycarbonate (PC), polyethersulphone (PES), polycyclic olefin (PCO), polyarylate (PAR), polyetheretherketone (PEEK), polyimide (PI, fluorinated), polyacetylene, polyphenylene vinylene, polyvinylcarbazole, or polynaphthalene vinylene, an additional insulating thin silica or other non-reactive layer between the titania layer and transparent substrate (FIG. 2) can be used to prevent self-oxidation of the polymeric substrate.

Functionality Provided by Nanoparticles

Optimal design (e.g., selection of nanoparticle size and thickness of coating layers) and fabrication methods enables both maximizing photocatalytic effect to remove fingerprint film by UV light or sunlight and minimizing scattering problem (and haze) by the stacked nanoparticles (FIG. 1).

In addition to fingerprint films, there are several more common problems that significantly inhibit optical transparency: fogging, reflection, and contamination by organic material other than fingerprint film.

Porous structures created by hydrophilic nanoparticles can lead to additional useful functionalities such as anti-fogging effect. The hydrophilicity of titanium dioxide can be amplified by high Wenzel roughness of porous structure. See, Wenzel, R. N., Industrial & Engineering Chemistry 1936, 28, 988, which is incorporated by reference in its entirety. And this can create superhydrophbilicity that leads to the wicking of micrometric fog droplets deposited on transparent surfaces into the void spaces between nanoparticles, resulting in a clear view through the transparent surfaces. See, Cebeci, F. C.; Wu, Z.; Zhai, L.; Cohen, R. E.; Rubner, M. F., Langmuir 2006, 22, 2856, which is incorporated by reference in its entirety.

By depositing alternating layers with a low-index material and a high-index material below the outermost layer (the porous photocatalytic nanostructures (FIG. 2)), broadband anti-reflectivity throughout the entire visible region (400 nm-800 nm) can be achieved. The number of alternating layers can be also minimized to decrease the manufacturing cost. See, Biswas, P. K.; Kundu, D.; Ganguli, D., Journal of Materials Science Letters 1989, 8, 1436, which is incorporated by reference in its entirety.

Stains by common organic liquids such as coffee, wine, and oil can leave residues of organic materials that often reduce readability of letters on electronic displays. Soot deposition by smoke from cars in cities is another source that many window and windshield lose high level of transparency. Photocatalytic oxidization effect of titania nanoparticles can also remove these contaminants and help sustainable cleaning mechanism.

Lastly, bacterial contamination is a common source of disease infection in daily life. In hospitals, "super bacteria" that resist most antibiotics threaten life of patients, doctors, nurses and other people. Therefore, light—cleaning transparent materials that can kill those germs and bacteria can be used as a very effective method to prevent those problems.

Figure 3:
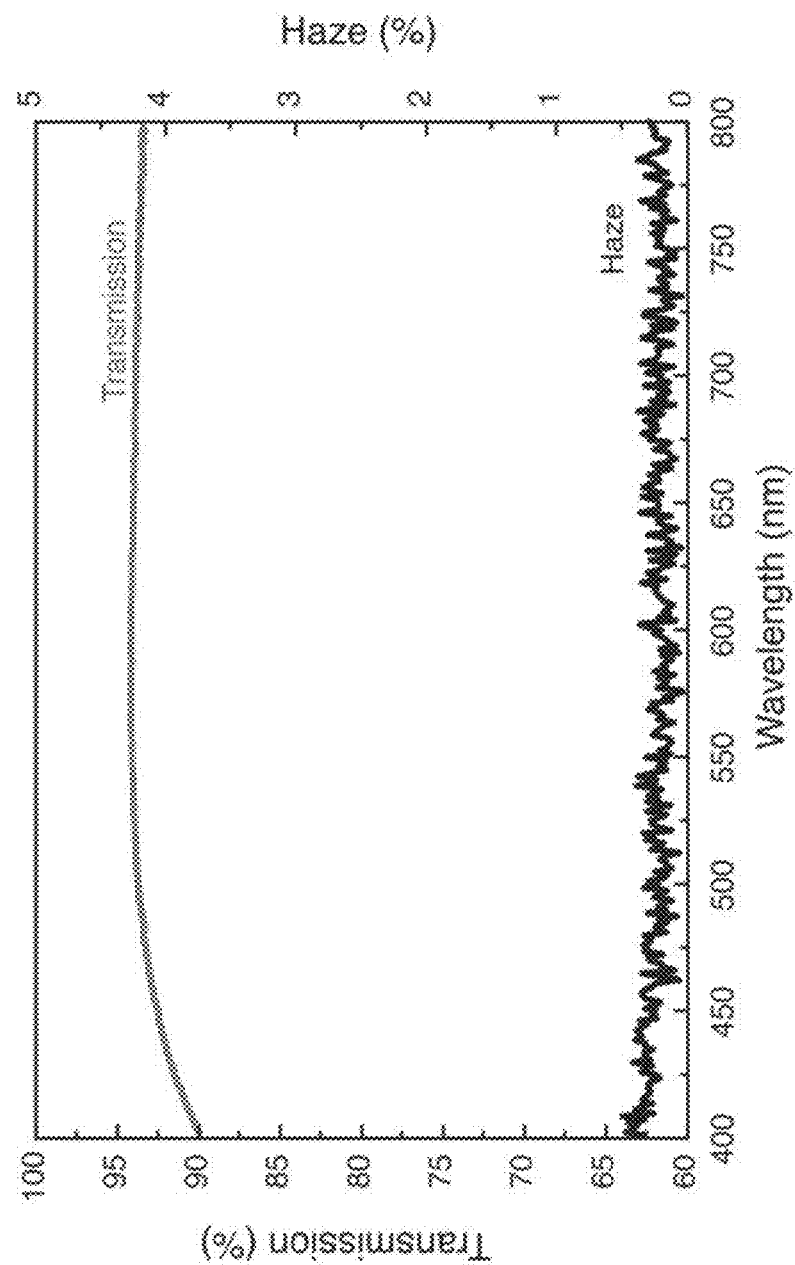
FIG. 3 is a graph depicting broadband diffuse transmission through the double-sided titanium oxide nanoparticle deposited surface.

FIG. 3 shows broadband diffuse transmission (red line) through the double-sided titanium oxide nanoparticle deposited surface (40 bilayers) at a normal incident angle with a range of wavelengths (400 nm<$\lambda$<800 nm). Optical haze is also shown in black line with respect to wavelength. The average haze over the range of wavelengths (400 nm<$\lambda$<800 nm) is around 0.3%.

Fabrication Method

To enable the uniform coating thickness with good optical property (e.g., low haze and high transmission), Layer-by-Layer (LbL) assembly technique can be used (FIG. 4). See, Wu, Z.; Lee, D.; Rubner, M. F.; Cohen, R. E., Small 2007, 3, 1445, Decher, G., Science 1997, 277, 1232, and Nuraje, N.; Asmatulu, R.; Cohen, R. E.; Rubner, M. F., Langmuir 2011, 27, 782, each of which is incorporated by reference in its entirety. Using oppositely charged polymeric solution and nanoparticle solutions, a conformal coating that is essential to reduce scattering or haze can be obtained. See, Lee, D.; Gemici, Z.; Rubner, M. F.; Cohen, R. E., Langmuir 2007, 23, 8833, and Shimomura, H.; Gemici, Z.; Cohen, R. E.; Rubner, M. F., Applied Materials and Interfaces 2010, 2, 813, each of which is incorporated by reference in its entirety. This coating method has benefits of extremely precise control of film thicknesses and uniformity even on curved surfaces, compared to other typical coating methods such as dip-coating, spray-coating, and solvent-casting.

Surfaces having a nanotexture can exhibit extreme wetting properties. A nanotexture refers to surface features, such as ridges, valleys, or pores, having nanometer (i.e., typically less than 1 micrometer) dimensions. In some cases, the features will have an average or rms dimension on the nanometer scale, even though some individual features may exceed 1 micrometer in size. The nanotexture can be a 3D network of interconnected pores. Depending on the structure and chemical composition of a surface, the surface can be hydrophilic, hydrophobic, or at the extremes, superhydrophilic or superhydrophobic. One method to create the desired texture is with a polyelectrolyte multilayer. Polyelectrolyte multilayers can also confer desirable optical properties to surfaces, such as anti-reflectivity, or reflectivity in a desired range of wavelengths. See, for example, U.S. Patent Application Publication No. 2003/0215626, and U.S. patent application Ser. No. 10/912,540, each of which is incorporated by reference in its entirety.

Hydrophilic surfaces attract water; hydrophobic surfaces repel water. In general, a non-hydrophobic surface can be made hydrophobic by coating the surface with a hydrophobic material. The hydrophobicity of a surface can be measured, for example, by determining the contact angle of a drop of water on the surface. The contact angle can be a static contact angle or dynamic contact angle. A dynamic contact angle measurement can include determining an advancing contact angle or a receding contact angle, or both. A hydrophobic surface having a small difference between advancing and receding contact angles (i.e., low contact angle hysteresis) can be desirable. Water droplets travel across a surface having low contact angle hysteresis more readily than across a surface having a high contact angle hysteresis.

A surface can be superhydrophilic. A superhydrophilic surface is completely and instantaneously wet by water, i.e., exhibiting water droplet advancing contact angles of less than 5 degrees within 0.5 seconds or less upon contact with water. See, for example, Bico, J. et al., *Europhys. Lett.* 2001, 55, 214-220, which is incorporated by reference in its entirety. At the other extreme, a surface can be superhydrophobic, i.e. exhibiting a water droplet advancing contact angles of 150° or higher. The lotus leaf is an example of a superhydrophobic surface (See Neinhuis, C.; Barthlott, W. *Ann. Bot.* 1997, 79, 677; and Barthlott, W.; Neinhuis, C. *Planta* 1997, 202, 1, each of which is incorporated by reference in its entirety). The lotus leaf also exhibits very low contact angle hysteresis: the receding contact angle is within 5° of the advancing contact angle (See, for example, Chen, W.; et al. *Langmuir* 1999, 15, 3395; and Oner, D.; McCarthy, T. J. *Langmuir* 2000, 16, 7777, each of which is incorporated by reference in its entirety).

Photochemically active materials such as $TiO_2$ can become superhydrophilic after exposure to UV radiation; or, if treated with suitable chemical modifications, visible radiation. Surface coatings based on $TiO_2$ typically lose their superhydrophilic qualities within minutes to hours when placed in a dark environment, although much progress has been made towards eliminating this potential limitation. See, for example, Gu, Z. Z.; Fujishima, A.; Sato, O. *Angewandte Chemie-International Edition* 2002, 41, (12), 2068-2070; and Wang, R.; et al., *Nature* 1997, 388, (6641), 431-432; each of which is incorporated by reference in its entirety.

Textured surfaces can promote superhydrophilic behavior. Early theoretical work by Wenzel and Cassie-Baxter and more recent studies by Quere and coworkers suggest that it is possible to significantly enhance the wetting of a surface with water by introducing roughness at the right length scale. See, for example, Wenzel, R. N. *J. Phys. Colloid Chem.* 1949, 53, 1466; Wenzel, R. N. *Ind. Eng. Chem.* 1936, 28, 988; Cassie, A. B. D.; Baxter, S. *Trans. Faraday Soc.* 1944, 40, 546; Bico, J.; et al., D. *Europhysics Letters* 2001, 55, (2), 214-220; and Bico, J.; et al. *Europhysics Letters* 1999, 47, (6), 743-744, each of which is incorporated by reference in its entirety. Building on this work, it has recently been demonstrated that both lithographically textured surfaces and microporous surfaces can be rendered superhydrophilic. See, e.g., McHale, G.; Shirtcliffe, N. J.; Aqil, S.; Perry, C. C.; Newton, M. I. *Physical Review Letters* 2004, 93, (3), which is incorporated by reference in its entirety. The intriguing possibility of switching between a superhydrophobic and superhydrophilic state has also been demonstrated with some of these surface structures. See, for example, Sun, T. L.; et al. *Angewandte Chemie-International Edition* 2004, 43, (3), 357-360; and Gao, Y. F.; et al. *Langmuir* 2004, 20, (8), 3188-3194, each of which is incorporated by reference in its entirety.

Layer-by-layer processing of polyelectrolyte multilayers can be used to make conformal thin film coatings with molecular level control over film thickness and chemistry. Charged polyelectrolytes can be assembled in a layer-by-layer fashion. In other words, positively- and negatively-charged polyelectrolytes can be alternately deposited on a substrate. One method of depositing the polyelectrolytes is to contact the substrate with an aqueous solution of polyelectrolyte at an appropriate pH. The pH can be chosen such that the polyelectrolyte is partially or weakly charged. The multilayer can be described by the number of bilayers it includes, a bilayer resulting the sequential application of oppositely charged polyelectrolytes. For example, a multilayer having the sequence of layers PAH-PAA-PAH-PAA-PAH-PAA would be said to be made of three bilayers.

These methods can provide a new level of molecular control over the deposition process by simply adjusting the pH of the processing solutions. A nonporous polyelectrolyte multilayer can form porous thin film structures induced by a simple acidic, aqueous process. Tuning of this pore forming process, for example, by the manipulation of such parameters as salt content (ionic strength), temperature, or surfactant chemistry, can lead to the creation of micropores, nanopores, or a combination thereof. A nanopore has a diameter of less than 150 nm, for example, between 1 and 120 nm or between 10 and 100 nm. A nanopore can have diameter of less than 100 nm. A micropore has a diameter of greater than 150 nm, typically greater than 200 nm. Selection of pore forming conditions can provide control over the porosity of the coating. For example, the coating can be a nanoporous coating, substantially free of micropores. Alternatively, the coating can be a microporous coating having an average pore diameters of greater than 200 nm, such as 250 nm, 500 nm, 1 micron, 2 microns, 5 microns, 10 microns, or larger.

Figure 4A:
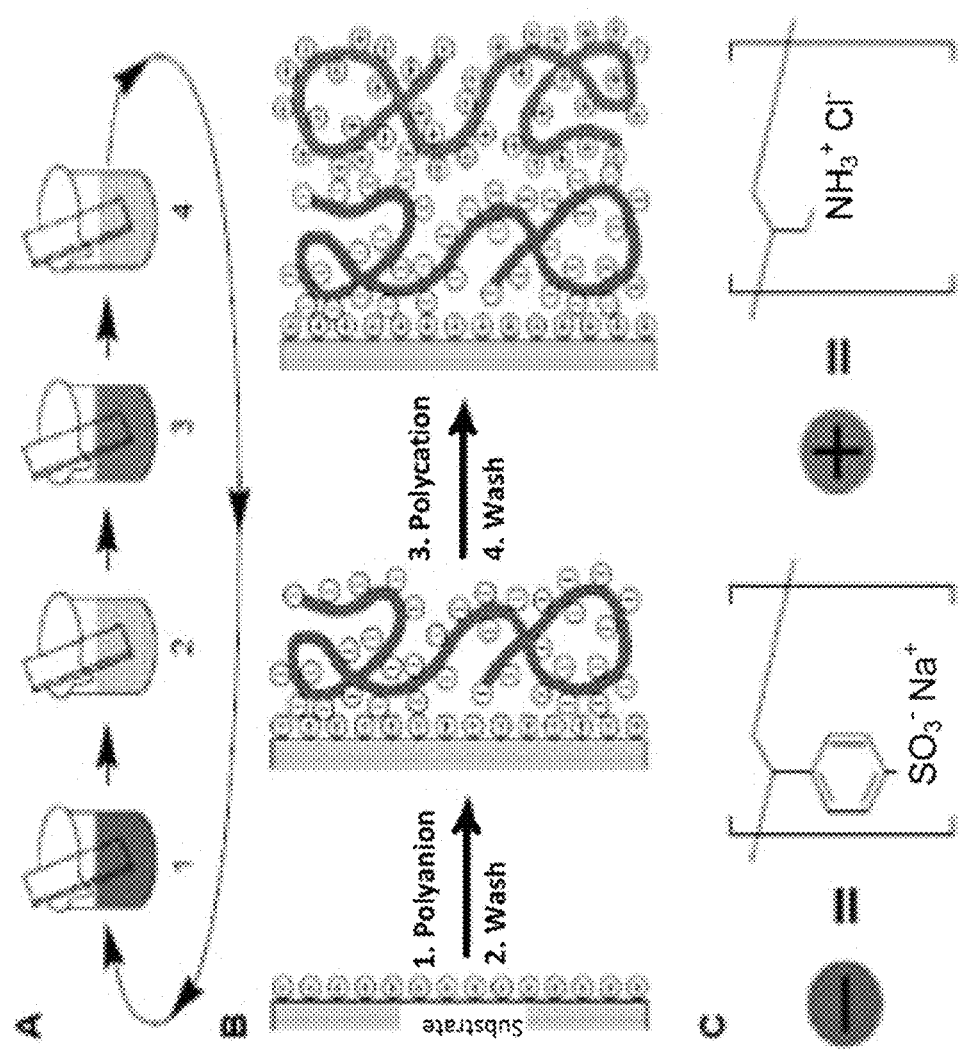
FIG. 4A is a schematics of LbL technique for a multilayer film.
Figure 4C:
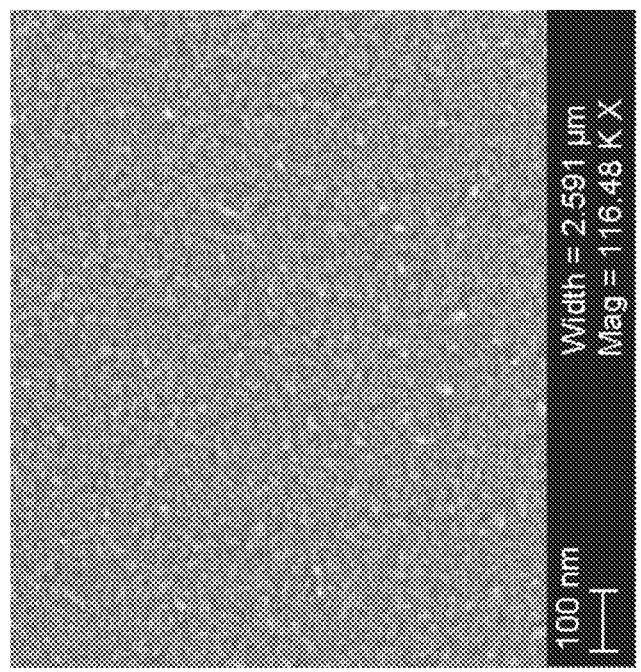
FIG. 4C is an SEM image of LbL-coated TiO$_2$ nanoparticles.
Figure 4B:
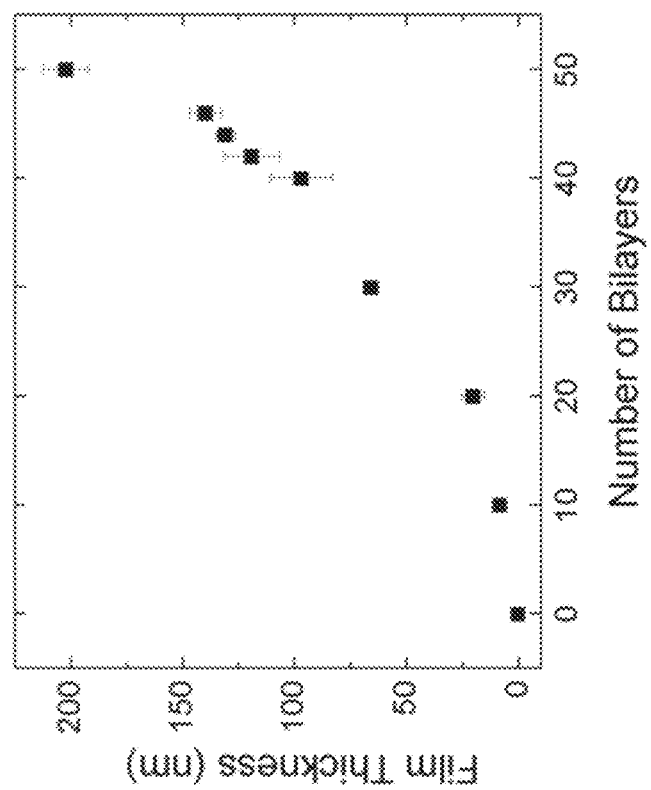
FIG. 4B is a graph depicting film thickness of the (PAH/TiO$_2$) multilayers coated on glass slides.

FIG. 4A is a schematic of LbL technique, a multilayer film is fabricated by alternately dipping a charged substrate into aqueous solutions of oppositely charged materials with intermediate steps of rinsing in water. FIG. 4B is a graph depicting film thickness of the (PAH/$TiO_2$) multilayers coated on glass slides, measured by profilometery. FIG. 4C is an SEM image of LbL-coated $TiO_2$ nanoparticles.

After drying the coated substrate, the substrate is calcinated (or annealed) to both remove all the organic materials on the sample and enhance adhesion between neighboring particles and between particle and substrate. The annealing temperature was chosen between 200° C. and 500° C. to keep the $TiO_2$ atomic structure (anatase) that maximizes photocatalytic effect. For flexible substrate (e.g., polymer) or other cases that high temperature annealing method cannot be employed, hydrothermal treatment can be used o enhance mechanical scratch-resistance.

Photocatalytic Degradation

Figure 5B:
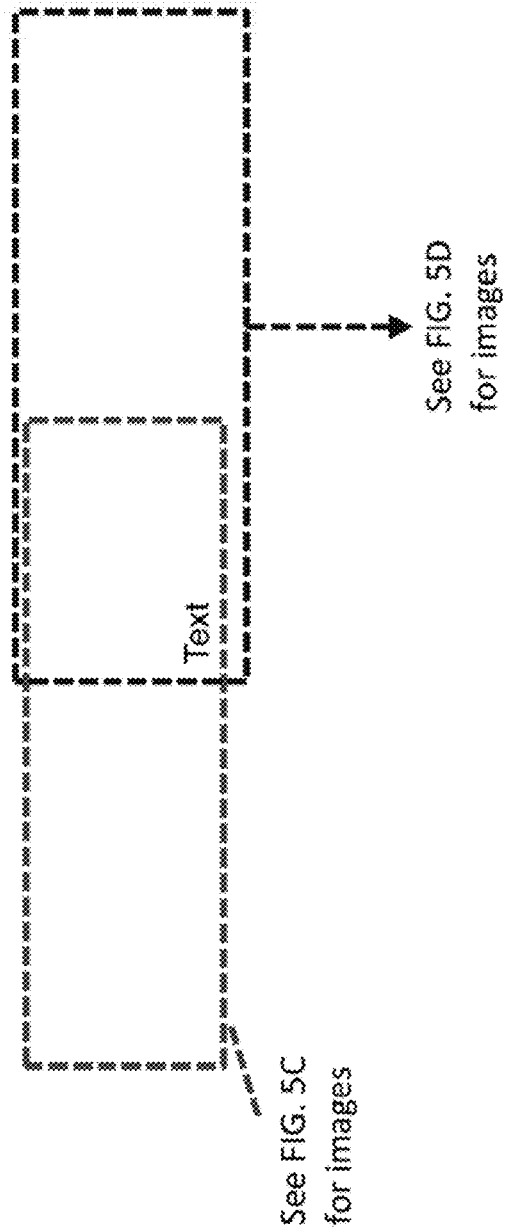
FIG. 5B is a schematic illustration of the two-step mechanism that leads to degradation of the sebum. A schematic illustration of photocatalytic effect on TiO$_2$ nanoparticles is shown in the gray dotted box.
Figures 5C, 5D:
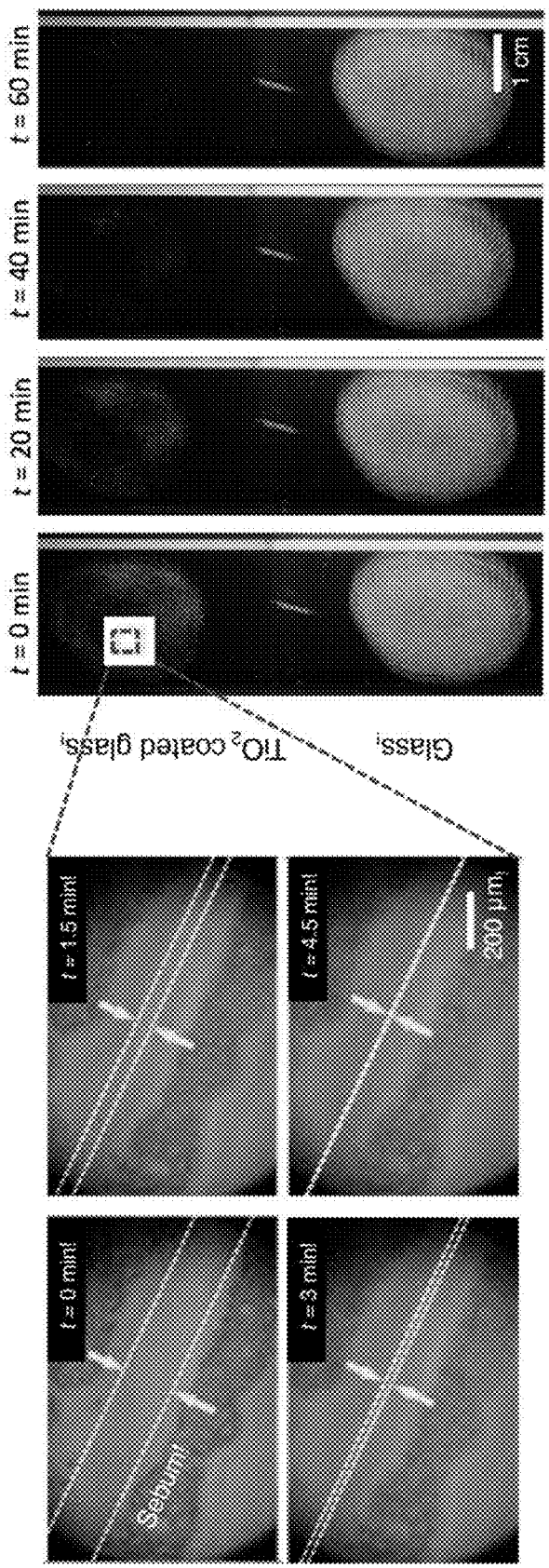
FIG. 5C is time-sequential images of the initial spreading and capillary imbibition of fingerprint oils by capillary force.
FIG. 5D is time-sequential images of fingerprint oils on the nanoparticle coated side (top side) and a typical microscope slide (bottom side).

To reduce the characteristic time required for photocatalytic degradation of fingerprint oils, nanoporous $TiO_2$ structures were designed to reduce the thickness of the deposited sebaceous film and increase the interfacial contact area with the photocatalytic $TiO_2$ nanoparticles based on the mechanism illustrated in FIG. 5B; (step 1) capillary imbibition of low surface tension components into the permeable nanostructure and (step 2) photocatalytic decomposition of the imbibed liquids on $TiO_2$ nanoparticles. Rapid wicking of the low surface tension organic liquids that compose the sebum results in imbibition into the porous nanostructure. The creation of a very large surface area between the oil and the photocatalytic titania nanoparticles that constitute the transparent nanoporous coating helps accelerate the ensuing photocatalytic decomposition. The smaller the size of nanoparticles, the greater the surface area, leading to a shorter time required for photocatalytic decomposition of fingerprint oils. The spreading and imbibition of the viscous fingerprint oils shown in the microscopic images presented in FIG. 5C can be quantified using bright field microscopy. Analysis of wicking into a nanoporous medium results in a Washburn-like spreading law with the front position of the sebum given by $l_{front} - l_0 \Box \sqrt{Dt}$. See, Starov, V. M., Kostvintsev, S. R., Sobolev, V. D., Velarde, M. G. & Zhdanov, S. A. Spreading of liquid drops over dry porous layers: Complete wetting case. *J. Colloid Interface Sci.* 252, 397-408 (2002), and Starov, V. M., Zhdanov, V. G, Effective viscosity and permeability of porous media. *Colloids Surf A.* 192, 363-375 (2001), each of which is incorporated by reference in its entirety. Experiments and modeling both give a characteristic diffusion coefficient of $D=2 K_P P_c/\mu \sim 10^{-10}$ m²/s, where $K_P$ is the permeability of the porous layer, $P_c$ is the capillary pressure inside a pore, and $\mu$ is the viscosity of sebum. The time required for complete lateral capillary spreading over the characteristic distance between two friction ridges ($\Delta L \sim 10^2$ µm) is therefore only $\Delta t \sim 10^2$ seconds. The subsequent decomposition of the oils when exposed to UV light (UVM-57, UVP Inc.) is visualized in the optical images shown in FIG. 5D. FIG. 5D is time-sequential images of fingerprint oils on the nanoparticle coated side (top side, thickness=114.8±6.2 nm) and a typical microscope slide (bottom side) for 0, 20, 40, 60 minutes of UV exposure (I=1.5±0.1 mW/cm² at 300 nm<λ<400 nm). The dactylogram deposited on the righthand side of the glass slide (which is coated with the $TiO_2$ nanoparticle film) is first imbibed and then photocatalytically degraded. By contrast, an identical print deposited on a typical uncoated microscope glass slide (left side) remains unchanged even though both surfaces are continuously exposed to UV light (1.5±0.1 mW/cm² at 300 nm<λ<400 nm) for the same period of 1 hour.

In addition to enhancing the photocatalytic effect, maximizing light transmissivity and minimizing the optical haze are also important requirements for the design of practical transparent dactylovorous surfaces. Because the wavelength of incident light is more than an order of magnitude greater than the components that constitute the nanostructured material, a representative volume element can be modeled as a homogeneous medium with the refractive index determined by the volumetric ratio of the individual materials, according to effective medium theory. See, Sihvola, A. H. *Electromagnetic mixing formulas and applications* (Institution of Electrical Engineers, 1999), Joannopoulos, J. D. *Photonic crystals: Molding the flow of light. second edition*, (Princeton University Press, 2008), Maldovan, M., Bockstaller, M. R., Thomas, E. L. & Carter, W. C. Validation of the effective-medium approximation for the dielectric permittivity of oriented nanoparticle-filled materials: Effective permittivity for dielectric nanoparticles in multilayer photonic composites. *Appl. Phys. B: Lasers Opt.* 76, 877-884 (2003), and Yoldas, B. E. Investigations of porous oxides as an antireflective coating for glass surfaces. *Appl. Opt.* 19, 1425-1429 (1980), each of which is incorporated by reference in its entirety. Designing the nanostructured coating to have a high porosity $p=(1-\varphi)$, (where $\varphi$ is the packing density of $TiO_2$ nanoparticles) leads to a smaller refractive index than the value for flat silicate glass, thus reducing reflection and increasing transmissivity within a specific wavelength region when compared to flat $TiO_2$ film with the same overall thickness. See, Lee, D., Rubner, M. F. & Cohen, R. E. All-nanoparticle thin-film coatings. *Nano Lett.* 6, 2305-2312 (2006), which is incorporated by reference in its entirety. Moreover, the small length scale of the nanoparticle constituents ($<\lambda/10$) also leads to reduced haze generation with the incident light. Considering these design constraints, the diameter of the particles needs to be less than ~40 nm, a commercially available $TiO_2$ nanoparticle dispersion (Svaya Inc.) with average diameter of 22 nm was chosen to develop the nanoporous coating.

Figure 6B:
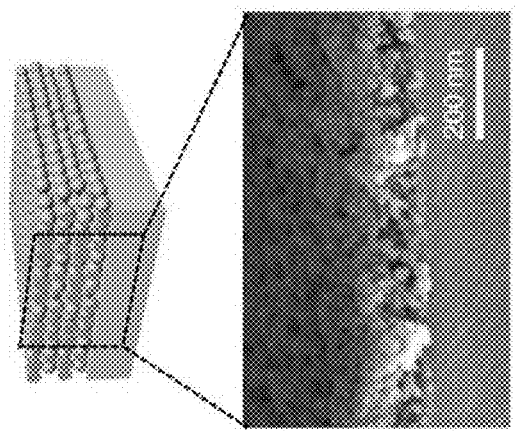
FIG. 6B is a schematic illustration and SEM image of the nanoparticle coated surface.
Figure 6A:
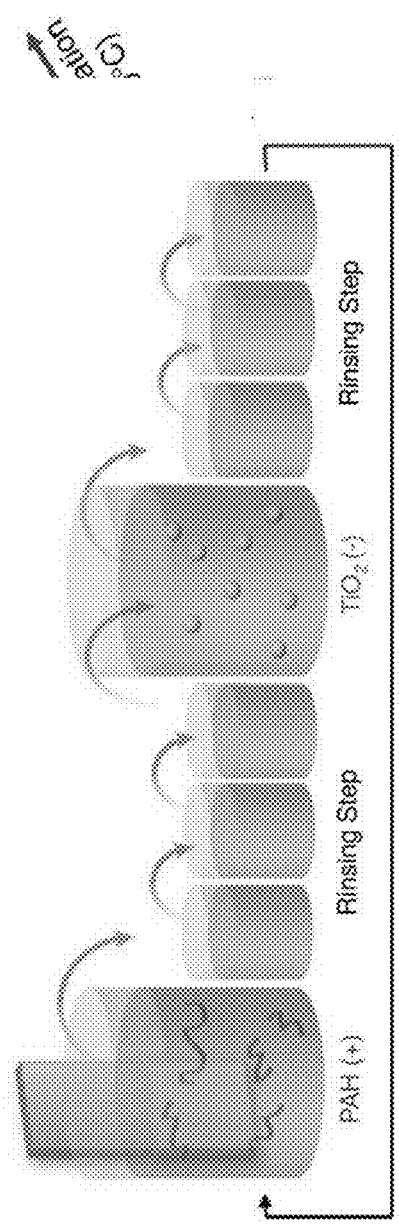
FIG. 6A is a schematic illustration of Layer-by-Layer (LbL) coating process.

In addition to design constraints on the size of the titania nanoparticles, the thickness of the coating layer must be optimized and precisely controlled using a reliable and reproducible fabrication method to create conformal coatings with low optical haze (i.e. minimized scattering of incident visible light). Layer-by-Layer (LbL) assembly (see Examples for details) was used for alternating depositions of a positively-charged poly(allylamine hydrochloride) (PAH) and negatively-charged titania nanoparticle dispersion. See, Lee, D., Rubner, M. F. & Cohen, R. E. All-nanoparticle thin-film coatings. *Nano Lett.* 6, 2305-2312 (2006), Rubner, M. F. & Cohen, R. E. *Multilayer thin films: Sequential assembly of nanocomposite materials* (Wiley-VCH, 2012), Shimomura, H., Gemici, Z., Cohen, R. E. & Rubner, M. F. Layer-by-Layer-assembled high-performance broadband antireflection coatings. *ACS Appl. Mater. Interfaces* 2, 813-820 (2010), Wu, Z. Z. et al. Deformable antireflection coatings from polymer and nanoparticle multilayers. *Adv. Mater.* 18, 2699-2702 (2006), and Krogman, K. C., Zacharia, N. S., Grillo, D. M., & Hammond, P. T. Photocatalytic Layer-by-Layer coatings for degradation of acutely toxic agents. *Chem. Mater.* 20, 1924-1930 (2008), each of which is incorporated by reference in its entirety. FIG. 6A shows uniform deposition of nanoparticles and precise control of thickness via the number of assembly steps. LbL assembly leads to conformal coatings with low optical haze when compared to other thin-film coating methods such as dip-coating, spray-coating or sol-gel processes. To remove the polymeric binder and to reinforce the structural durability of the nanoparticle coating, the LbL-coated glass slides were calcinated for 3 hours at temperatures not exceeding 350° C. (to ensure that the photocatalytic anatase structure of the titania was not transformed to a rutile form), resulting in a highly porous and sintered titania film. A schematic drawing of the nanoporous $TiO_2$ nanoparticle coating after calculation and a corresponding SEM image are shown in FIG. 6B. FIG. 6C shows film thickness of $TiO_2$ nanoparticle coating layer with respect to the number of coated dipping cycles, measured using profilometry (Dektak) and shows the growth behavior, and the measured thickness of the $TiO_2$ nanoparticle coating both before and after calcination. The coating thickness increases smoothly and monotonically, which enables accurate control of the thickness as the number of deposited PAH/TiO$_2$ dipping cycles is increased.

The porosity of the coating after calcination is determined by using ellipsometry to measure the values of the effective refractive index of the nanoporous film when two different fluids of known refractive index are imbibed into the porous structure. After calcination the porosity of the LbL titania nanoparticle coatings was determined to be p=(1−φ)=0.496. This relatively large porosity lowers the effective refractive index of the final dry titania coating to $n_{eff}$=1.478 (λ=633 nm), which leads to suppression of reflections from the surface and enhances capillary imbibition of fingerprint oils into the nanoporous surfaces. Taking a representative coating thickness of 100 nm after calcination, the accessible surface area of this photocatalytic nanostructure corresponds to approximately 14 cm$^2$ per square centimeter of coated glass, and increases linearly with the number of LbL deposition steps.

Figure 6D:
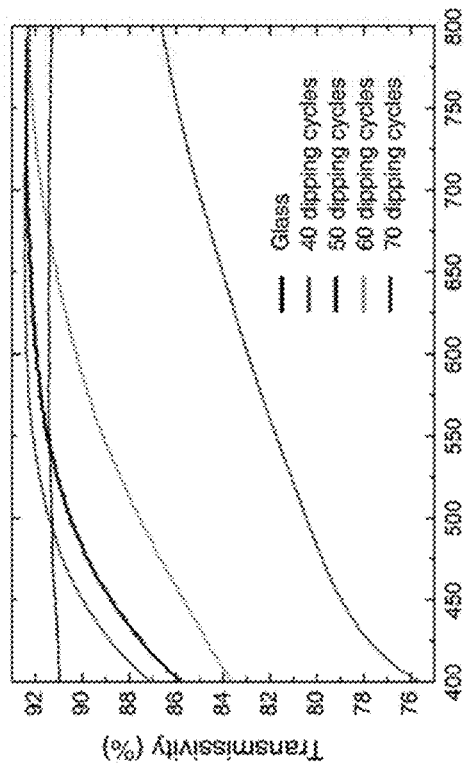
FIG. 6D is a graph depicting measured optical transmissivity over the visible range for four different thicknesses of TiO$_2$ nanoparticle layers.
Figure 6C:
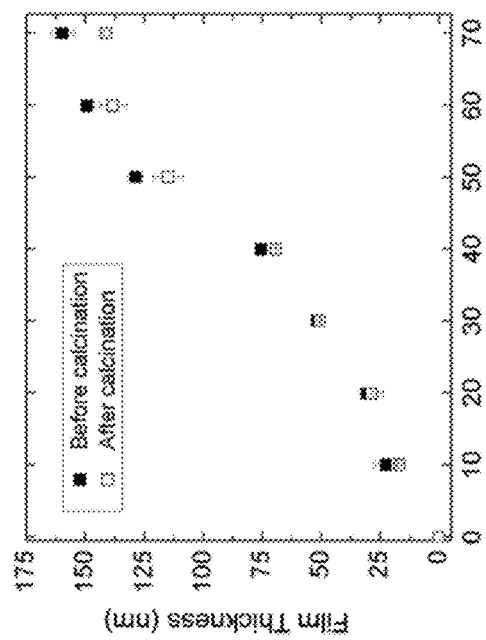
FIG. 6C is a graph depicting film thickness of TiO$_2$ nanoparticle coating layer with respect to the number of coated dipping cycles.

To guide the selection of the optimal thickness of this transparent photocatalytic TiO$_2$ coating, the optical transmissivity value over the wavelength range of visible light was measured, as shown in FIG. 6D. FIG. 6D shows measured optical transmissivity over the visible range (400 nm≤λ≤800 nm) for four different thicknesses of TiO$_2$ nanoparticle layers. The black line represents the average transmissivity of a typical microscope (soda lime) glass slide.

As the number of PAH/TiO$_2$ dipping cycles deposited on the glass slides is increased, progressively lower optical transmissivity is measured over the spectral region of interest (400 nm≤λ≤800 nm). However the layered nanoparticle structures with N=40 ($d_{40}$=69.0±0.4 nm) and 50 dipping cycles ($d_{50}$=114.8±6.2 nm) still have greater average transmissivity (over wavelengths 550 nm≤λ≤800 nm), compared to a bare glass slide without a TiO$_2$ nanoparticle coating. This reduced reflectivity arises because of destructive thin-film interference at the air-nanoparticle-glass interfaces. See, Shimomura, H., Gemici, Z., Cohen, R. E. & Rubner, M. F. Layer-by-Layer-assembled high-performance broadband antireflection coatings. *ACS Appl. Mater. Interfaces* 2, 813-820 (2010), and Wu, Z. Z. et al. Deformable antireflection coatings from polymer and nanoparticle multilayers. *Adv. Mater.* 18, 2699-2702 (2006), each of which is incorporated by reference in its entirety.

Figure 7A:
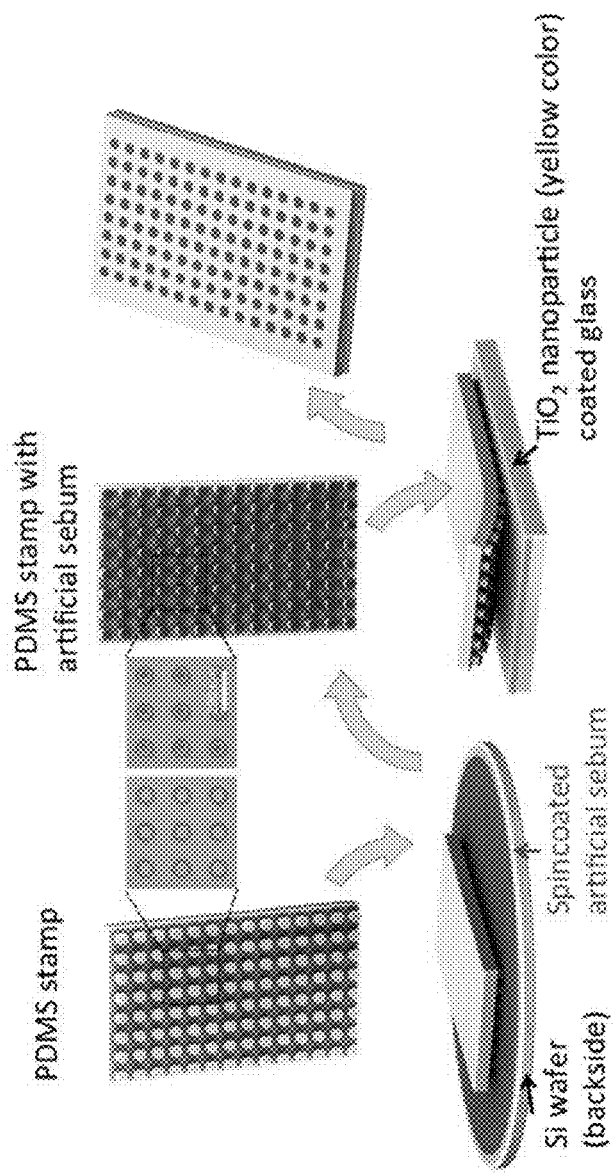
FIG. 7A is an illustration of the experimental process for quantifying the dactylovorous effect.
Figures 7B, 7C:
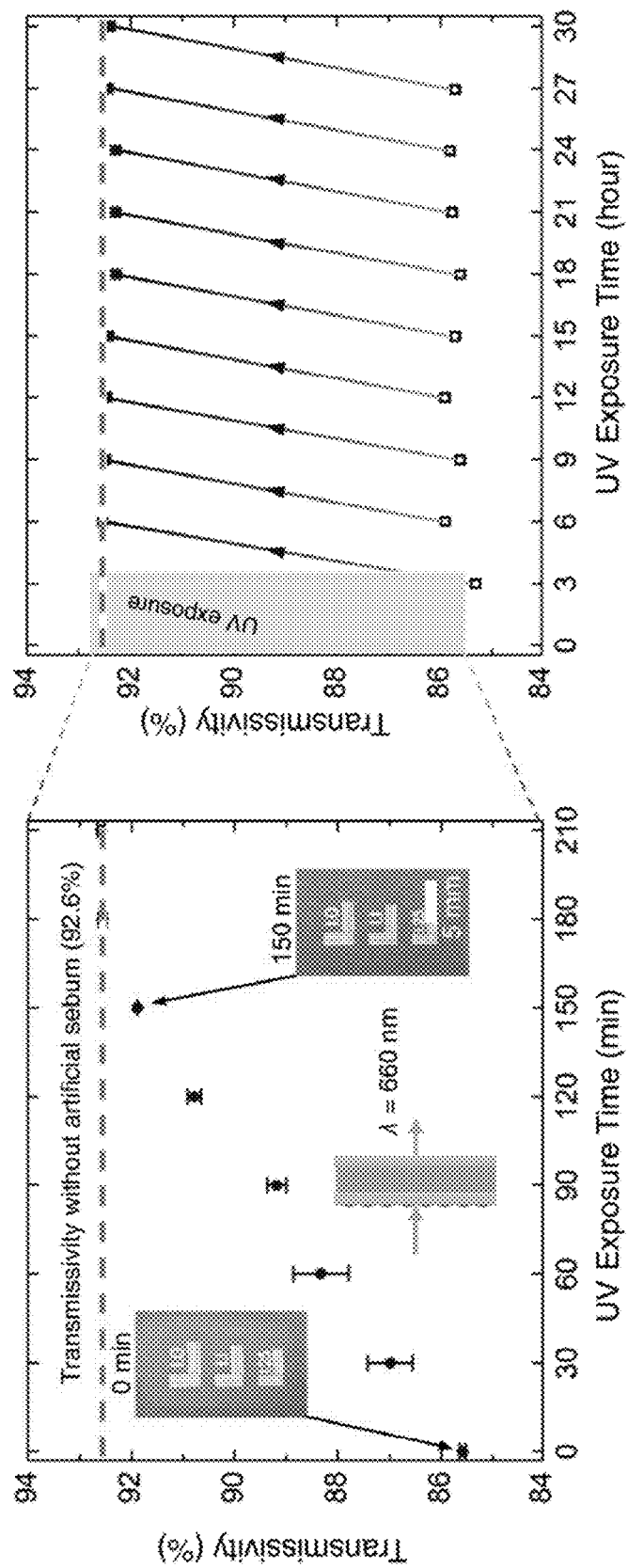
FIG. 7B is a graph depicting time evolution of measured through an artificial sebum-stamped spot of a 50 dipping cycle thick TiO$_2$ nanoparticle coating under UV light.
FIG. 7C is a graph depicting longevity test of the 50 dipping cycle nanoporous dactylovorous coating.

Since optical haze induced by the nanoporous coating is also an important factor in selecting an optimal thickness, the haze (according to ASTM D1003) was also measured as the number of deposited layers was increased. See, D1003 Standard test method for haze and luminous transmittance of transparent plastics, ASTM Standards, which is incorporated by reference in its entirety. The average haze remains less than 2% over the spectral range of visible light (400 nm≤λ≤800 nm) but increases steadily as the coating thickness increases as shown in Table 1. To determine an optimal thickness which balances the trade-off between optical properties (loss of optical transmissivity and haze) and the increased pore surface area for fingerprint decomposition, the dactylovoracity for different coated thicknesses of the porous TiO2 nanostructure was quantified using a polydimethylsiloxane (PDMS)-based stamp that consists of a square array of periodic posts (period=200 μm) 'inked' with an artificial sebum ($\gamma_{LV}$=33.4±0.7 mN/m) as shown in FIG. 7A (see Examples for details). The two microscope images correspond to the PDMS stamp with micrometric post array before depositing artificial sebum (left), and the same PDMS stamp with the absorbed sebum (right). FIG. 7B shows the measured transmissivity of monochromatic light (λ=660 nm from a diode laser) for a 50 dipping cycle film ($d_{50}$=114.8±6.2 nm) with respect to UV exposure time. The sebum deposited on the surface triggers optical reflection and scattering, and the transmissivity initially drops to 85.5% from the original value of 92.6%. As the surface is exposed to UV light (with an average intensity of 1.5±0.1 mW/cm$^2$ averaged over the range 300 nm<λ<400 nm) the transmissivity gradually recovers to this initial, sebum-free value, and the distortional effects of the sebum disappear after 150 minutes of UV exposure. The inset images of the standard rest resolution targets further illustrate that image visibility through the 50 dipping cycle film ($d_{50}$=114.8±6.2 nm) is fully recovered after 150 minutes of UV light exposure (t=0 min (left) and 150 min (right); see Examples for further details).

TABLE 1

Optical transmissivity and haze of the nanoporous titania coatings used for sebum digestion

|  | Average Thickness | Average transmissivity | Average haze | Photocatalytic effect* |
|---|---|---|---|---|
| SunClean™ glass** | — | 72.5% | — | ~15 hours |
| 40 dipping cycles | 69 nm | 91.63% | 0.34% | >270 minutes |
| 50 dipping cycles | 115 nm | 91.13% | 0.79% | ~150 minutes |
| 60 dipping cycles | 138 nm | 89.46% | 1.08% | ~30 minutes |
| 70 dipping cycles | 141 nm | 82.58% | 1.77% | <30 minutes |

*Required exposure time until the moment that the optical transmissivity reaches 99% of the original transmissivity measured under UV illumination (I = 1.5 ± 0.1 mW/cm$^2$ at 300 nm < λ < 400 nm) without the artificial sebum.

The average values of transmissivity and haze as well as the time required for degrading the stamped artificial sebum are summarized in Table 1. Although the sebum film deposited on top of a thicker 60 dipping cycle TiO$_2$ nanoparticle coating ($d_{60}$=138.2±5.7 nm) disappears more rapidly (within 30 minutes of the same UV light exposure), the average optical transmissivity remains below that of a flat uncoated microscope glass slide. Conversely, transmissivity tests with artificial sebum deposited on a thinner, 40 dipping cycle TiO$_2$ nanoparticle coating ($d_{40}$=69.0±0.4 nm) showed that the oils did not completely vanish even after 270 minutes of UV light exposure because of the lower pore area available for photocatalytic digestion of the sebum. A 70 dipping cycle coating shows the fastest photocatalytic effect, however, the average haze value of this coating is greater than 1%, which exceeds the standard threshold desired in the touch screen industry. See, Yan, H., Jo, T. & Okuzaki, H. Potential application of highly conductive and transparent poly(3,4-ethylenedioxythiophene)/poly(4-styrenesulfonate) thin films to touch screen as a replacement for indium tin oxide electrode. *Polym. J.* 43, 662-665 (2011), which is incorporated by reference in its entirety. It should be noted that in comparison with a commercially available glass coated with TiO$_2$, SunClean™, the 60 dipping cycle coating which has an averaged transmissivity 16% greater than that of the SunClean™ glass shows 30 times shorter time to degrade the stamped artificial sebum under the same UV exposure condition.

Based on the results summarized in Table 1, the thickness of the coating can be chosen depending on specific applications and their requirements. Here, a 50 dipping cycle coating (with thickness $d_{50}$=114.8±6.2 nm) was chosen as the optimal thickness for constructing the transparent dactylovorous surfaces because it successfully suppresses reflectivity with comparably low haze whilst also realizing practically reasonable degradation times (<150 minutes). In addition, the longevity test of the TiO$_2$ nanoparticle coatings that measures transmissivity of the coating ($\lambda$=660 nm) before and after the ten successive depositions of artificial sebum pattern followed by 3-hour UV exposure shows full recovery of transmissivity value on top of the 50 dipping cycle nanoporous dactylovorous coating. FIG. 7C shows longevity test of the 50 dipping cycle nanoporous dactylovorous coating. The blue square dots clearly represent the full recovery (up to 10 cycles) with approximately no change in optical transmissivity ($\lambda$=660 nm) and consistent UV exposure time (3 hours) that takes to reach the initial transmissivity after repeated stamping the artificial sebum pattern. The hollow blue square dots indicate the transmissivity values right after the deposition of the artificial sebum. The blue lines with arrows represent the recovery of transmissivity. The red colored transparent box shows the single cycle of photocatalytic decomposition of the artificial sebum during 3 hours of UV exposure that is also shown in FIG. 3b. As shown in FIG. 7C, the optical transmissivity ($\lambda$=660 nm) immediately drops to the values less than 86% after the artificial sebum is deposited on the nanoporous coating, and it recovers to the initial transmissivity value after 3-hour UV exposure.

Figure 8A:
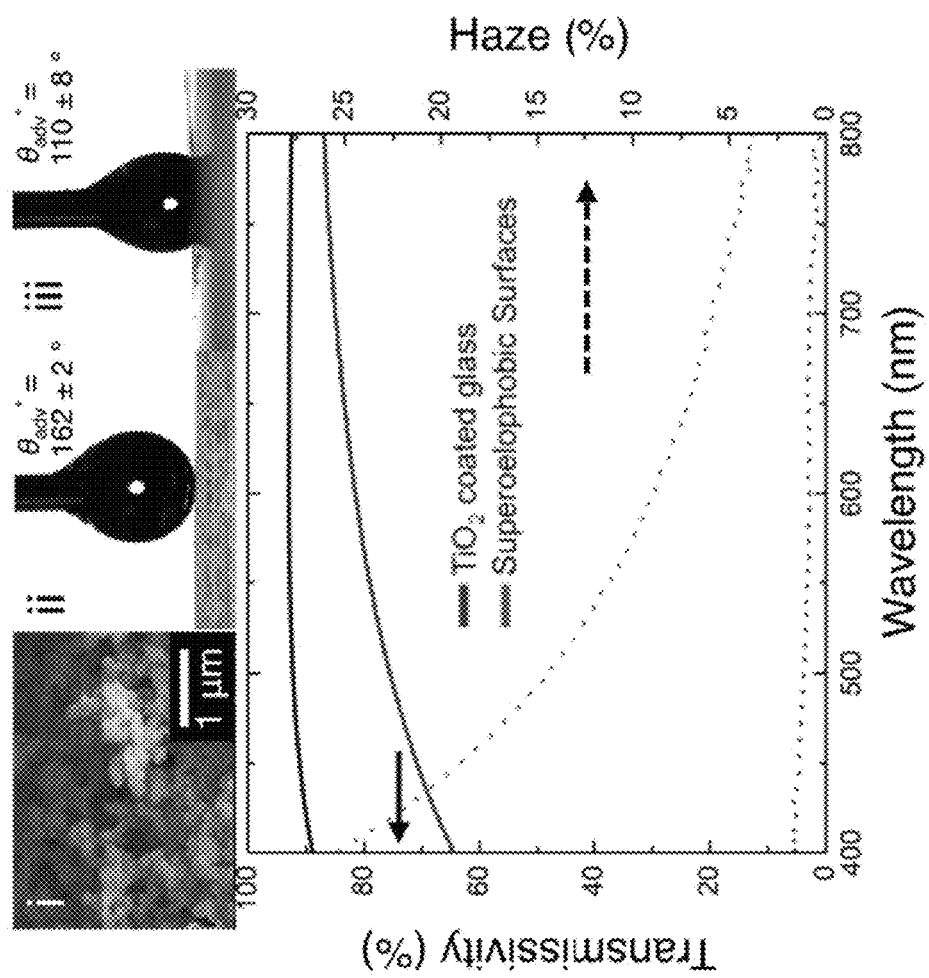
FIG. 8A shows optical spectral responses and haze of the TiO$_2$ nanoparticle surface (blue) and the superoleophobic soot-based surface (red).

To compare the optical properties and mechanical durability of the dactylovorous surface with an alternate antifingerprint coating approach consisting of a transparent superoleophobic coating, the surfaces were prepared by deposition of candlesoot, followed by $SiO_2$ vapor deposition, calcination, and a chemical vapor deposition of perfluorodecyltrichlorosilane as shown in FIG. 8A. See, Deng, X., Mammen, L., Butt, H. J. & Vollmer, D. Candle soot as a template for a transparent robust superamphiphobic coating. *Science* 335, 67-70 (2012), and uteja, A., Choi, W., Mabry, J. M., McKinley, G. H. & Cohen, R. E. Robust omniphobic surfaces. *Proc. Natl. Acad. Sci. U.S.A.* 105, 18200-18205 (2008), each of which are incorporated by reference in its entirety. When compared to the equivalent responses of the 50 dipping cycle nanoporous coating, the optical properties of this soot-templated superoleophobic surface (red) show an undesirable scattering of light and substantial haze that arise from the larger size of the soot nanoparticles (~100 nm) shown in the micrograph (i). Although goniometer tests (ii) show that the soot-templated surface is indeed superoleophobic with an advancing contact angle of 162=2° for a droplet of artificial sebum ($\gamma_{LV}$=33.4±0.7 mN/m), the re-entrant nanostructures are damaged irreversibly after a single application of a normal force of 4N (corresponding to a characteristic digital pressure of 4 N/81 $mm^2$~49 kPa). This results in the rapid loss of superoleophobicity shown in inset (iii) of FIG. 8A.

Figure 8B:
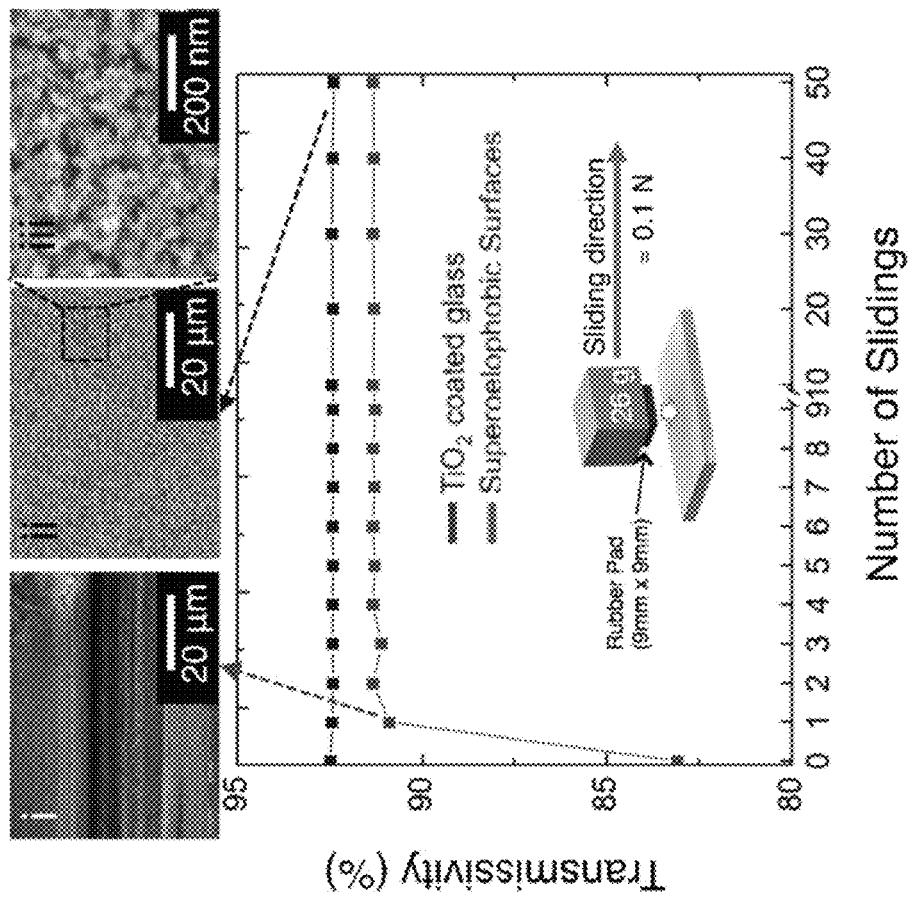
FIG. 8B shows mechanical durability test results of the $TiO_2$ nanoparticle coating against shear stress emulating sliding gesture of human fingers. The inset on the left hand side represents the SEM image of the destroyed region of the transparent superoleophobic coating, and two insets on the right hand side are the SEM images of the $TiO_2$ nanoparticle coating.

Moreover, mechanical durability of the dactylovorous surfaces was also confirmed with contact sliding test in comparison with the transparent superoleophobic coating fabricated with candle soot as a template. A latex rubber pad (contact area A=81 $mm^2$; 9 mm by 9 mm) with a applied normal force of 0.254 N repeatedly slides against the horizontally mounted nanotextured surfaces (on the dactylovorous surface (blue) and the superoleophobic soot-based surface surface (red); see the inset of FIG. 8B), which is equivalent to the minimum shear force applied by human fingers to operate capacitive touchscreen. See, Meyer, D. J., Peshkin, M. A., & Colgate, J. E. Fingertip friction modulation due to electrostatic attraction, *IEEE World Haptics Conference (WHC)* 2013, 43-48, 14-17 April 201336, which is incorporated by reference in its entirety. The measured kinetic friction coefficient between the rubber pad and the nanoporous coating is greater 0.5 (see Examples for details), which leads that the shear force applied to the dactylovorous surface is approximately 0.1 N that is greater than the minimum lateral frictional force on a fingertip against capacitive touchscreen. FIG. 8B shows approximately no change in optical transmissivity of the $TiO_2$ nanoparticle coating even after 50 times repeated contact sliding test. In contrast, optical transmissivity of the transparent superoleophobic coating is changed to that of a flat microscope glass slide because the transparent superoleophobic coating was destroyed during the single sliding of the rubber pad on the coating. The inset on the left hand side represents the SEM image of the destroyed region of the transparent superoleophobic coating, and two insets on the right hand side are the SEM images of the $TiO_2$ nanoparticle coating. The nanoporous $TiO_2$ surfaces also passed a standard cross-hatch test (ASTM D 3359) and showed excellent adhesion.

Figure 9A:
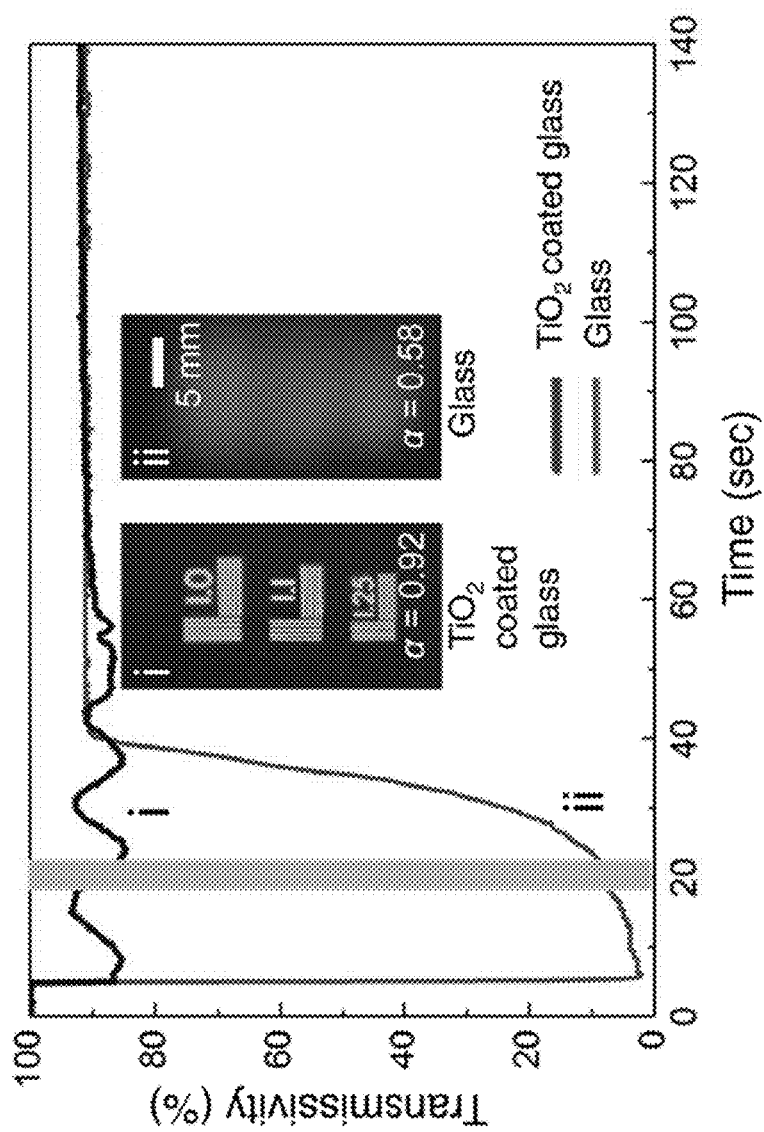
FIG. 9A shows time evolution of transmissivity due to fogging and defogging on a freshly-prepared $TiO_2$ nanoparticle coated surface (blue), and a bare glass microscope slide (red).

In addition to the superior optical transmissivity and enhanced mechanical robustness of the $TiO_2$ nanoporous surfaces as compared to the re-entrant superoleophobic surfaces, there are other benefits compared to typical flat glass surfaces, conferred by structural superhydrophilicity and photocatalytic activity such as anti-fogging property and anti-microbial efficacy, which can both be important in keeping a textured and porous surface clean. Firstly, because of the intrinsic superhydrophilicity arising from the porosity of the nanoparticle coating (see FIG. 14), the anti-fogging performance is readily achievable, which is important for retaining optical transmissivity under moderate fogging conditions such as very humid warm environments. FIG. 9A shows the time evolution of optical transmissivity after exposing a 50 dipping cycle nanoporous dactylovorous coating (at T=5.2±0.2° C.) and a bare glass slide at the same temperature (as control) to a stream of saturated steam followed by placing the surfaces (at time t=20 s) into the path of a laser probe beam ($\lambda$=660 nm from a diode laser). Insets show optical micrographs of a resolution test chart viewed through the nanoparticle coated glass (i) and the microscope glass slide (ii) taken at the moments marked by the green color bar. Image distortion analysis using a standard resolution test target is used to quantify the anti-fogging performance in a different way (see Methods for details). The clear in-focus left inset image of the resolution test chart is transmitted through the nanoporous surface, which shows the antifogging property ($\alpha$=0.92). The correlation coefficient ($\alpha$=0.58) for the right inset image (a fogged glass microscope slide case) indicates unacceptably poor visual clarity. Transmissivity through the fogged uncoated glass surface rapidly drops to 5% and then gradually increases to a constant value that remains lower than the initial value measured with the $TiO_2$ nanoparticle-coated surface. This loss of transmissivity on the flat hydrophilic surface is due to the scattering from the deposited microscopic water droplets that remain pinned at chemical and physical heterogeneities on the substrate, as well as intrinsic reflection at each air-glass interface. On the other hand, the measurement on the nanoporous coating shows a small initial drop in the transmitted intensity as a result of rapid imbibition of the deposited airborne water droplets into the porous structure, followed by a uniform and rapid evaporation rate across the entire surface. The periodic fluctuations in transmissivity arise from constructive and destructive interference of the light (Newton's rings; see, Eversole, W. G. & Lahr, P. H. The thickness of the rigid water film at a quartz-water interface from a measurement of Newton's rings. *J. Chem. Phys.* 9, 686-689 (1941), which is incorporated by reference in its entirety) that is characteristically observed on a uniformly thinning film of liquid. As shown in the insets of FIG. 9A, a clear in-focus image of the resolution test chart is transmitted through the nanoporous surface, which also illustrates the antifogging property conferred by structural superhydrophilicity. Conversely, when the target is viewed through the conventional fogged microscope glass slide placed adjacently, the target image is unresolvable.

Figure 9B:
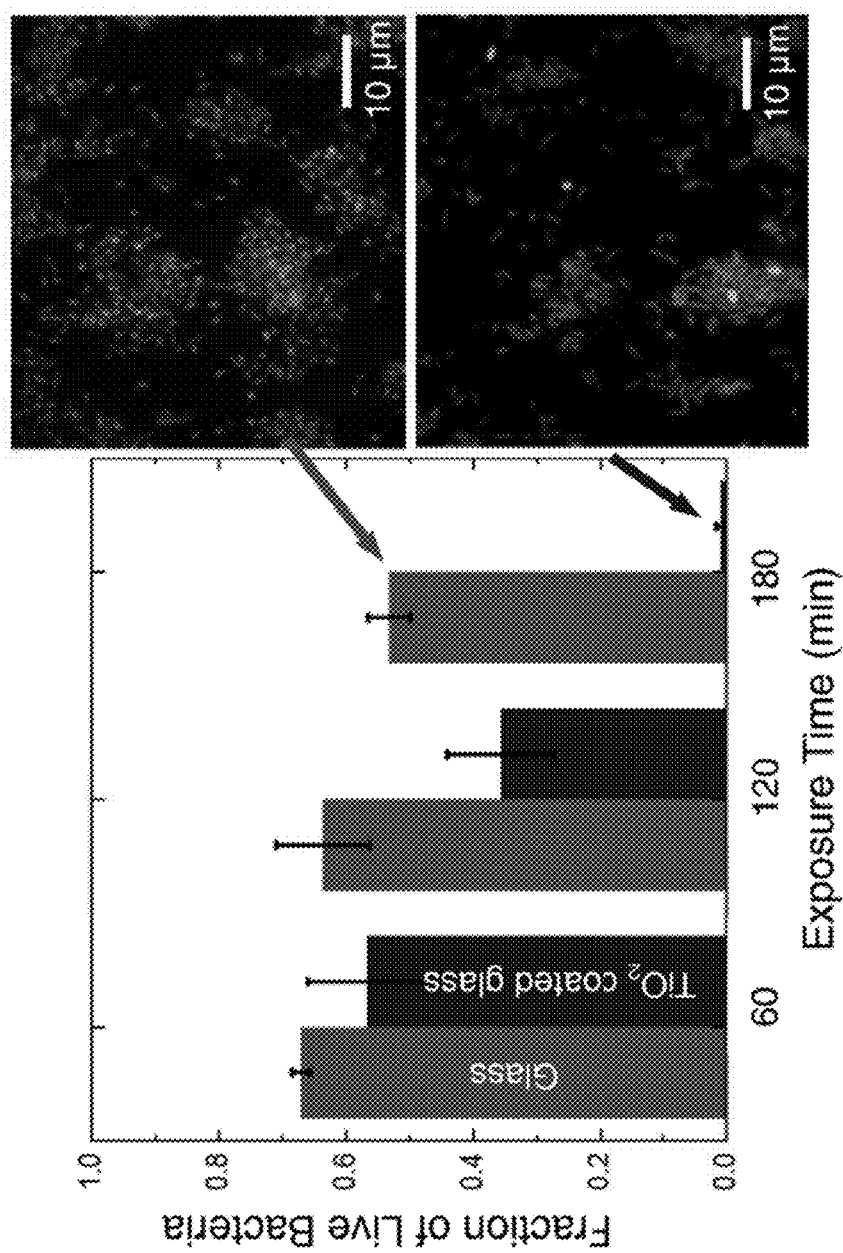
FIG. 9B shows fraction of live *E. coli* on the $TiO_2$ nanoporous surface (blue) and a microscope slide (red) with respect to exposure time.

Moreover, the anti-bacterial properties of these photocatalytic coatings were explored. FIG. 9B shows the time evolution of the percentage of live (green) and dead (red) bacteria on glass substrate (left) and the $TiO_2$ nanoparticle coated surfaces (right). Fluorescence images showing anti-bacterial activity of the $TiO_2$ nanoparticle-deposited surface under UV exposure (1.6±0.1 mW/cm2 at 300 nm<λ<400 nm) for 3 hours. Green and red colors represent live and dead E. coli on both the nanoparticle coated side (lower image) and a typical microscope glass slide (upper image). The dominant red coloration (99%) on the right hand image signifies dead bacteria (E. coli) whose membranes are destroyed by the free radicals generated from the photocatalytic effect of $TiO_2$ nanoparticles. See, ashimoto, K., Irie, H. & Fujishima, A. $TiO_2$ photocatalysis: A historical overview and future prospects. *Jpn. J. Appl. Phys.* 44, 8269-8285 (2005), and Fu, G. F., Vary, P. S. & Lin, C. T. Anatase $TiO_2$ nanocomposites for antimicrobial coatings. *J. Phys. Chem. B* 109, 8889-8898 (2005), each of which is incorporated by reference in its entirety.

Figure 9C:
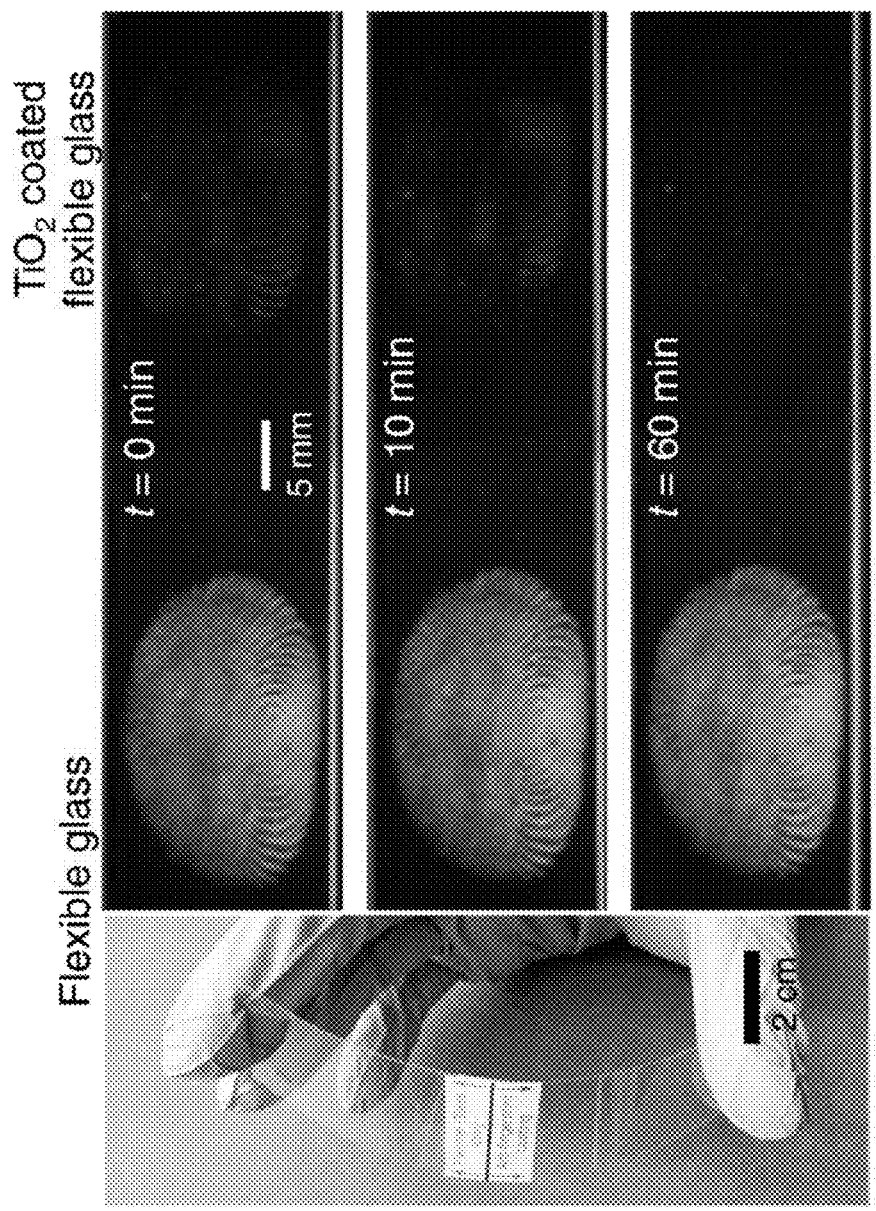
FIG. 9C shows flexible glass substrate deposited with a $TiO_2$ nanoparticle film (lower half on the left) by the LbL fabrication method.

For future applications such as flexible touch screens, the LbL fabrication method can be used to apply these $TiO_2$ nanoporous coatings to flexible glass substrates and secondly that the deposited sebum can also be degraded by direct exposure to natural sunlight within reasonable time durations. FIG. 9C shows flexible glass substrate deposited with a $TiO_2$ nanoparticle film (lower half on the left) by the LbL fabrication method. The three sequential images on the right show that a fingerprint deposited on the flexible dactylovorous surface progressively disappears under sunlight irradiation ($I_{solar}$=4±1 mW/cm$^2$ at 300 nm<λ<400 nm) for 3 hours. The number of dipping cycles for all of the titania nanoparticle coatings used in FIG. 8 is 50. As shown in FIG. 9C, a flexible glass substrate (thickness=0.1 mm, VWR) with 50 dipping cycles of PAH/$TiO_2$ deposited by LbL assembly followed by calcination can bend without damage (with a radius of curvature down to approximately 59 mm). FIG. 9C also shows three sequential images indicating that when fingerprint sebum is deposited on the flexible coating the dactylogram progressively disappears even under natural solar irradiation (with an averaged intensity over the wavelength range 300 nm<λ<400 nm, Isolar=4±1 mW/cm$^2$). The dactylovorous side on the right (constructed from 50 dipping cycles of PAH/$TiO_2$ followed by calcination) exhibits a similar photocatalytic effect to that observed under the UV lamp (with a power of 1.5±0.1 mW/cm$^2$ at 300 nm<λ<400 nm). The nanoporous coating again shows an initial imbibition of the oil followed by complete photocatalytic removal of fingerprint sebum within 3 hours. By contrast the dactylogram deposited on the uncoated glass surface (lefthand image) does not show any visual changes at all upon solar irradiation.

In summary, a nanoporous $TiO_2$ coating using LbL assembly techniques and subsequent calcination results in superoleophilic capillary imbibition when an oily liquid such as fingerprint sebum is deposited on the surface. The nanoporous $TiO_2$ coating exhibits unique dactylovorous properties but also has superior optical transmissivity, lower haze and increased mechanical durability compared to a re-entrant superoleophobic surface. Finally, the superhydrophilic and photocatalytic properties of the $TiO_2$ nanoporous coating result in additional anti-fogging and anti-bacterial properties as well as operational compatibility with flexible glass substrates and natural sunlight exposure, respectively.

EXAMPLES

Layer-by-Layer Assembly and Calcination of the $TiO_2$ Nanoparticle Coating

Sequential adsorption of polymer and nanoparticle layers was performed using a StratoSequence VI spin dipper (nanoStrata Inc.), controlled by StratoSmart v6.2 software, at 120-130 rpm. The concentrations of poly(allylamine hydrochloride) (PAH, MW=58,000 g/mol) and $TiO_2$ nanoparticle dispersions (Svaya Nanotechnologies, with mean diameter=22 nm) in the dipping solutions were 1 mg/mL and 0.03 wt % respectively. Distilled water (>18 MΩ·m, Millipore Milli-QTM) water (MQ water) was used in formulating the polymer solution, nanoparticle dispersion, and in all rinsing procedures. The dipping time in the PAH solutions and $TiO_2$ dispersions were each 10 min followed by three sequential rinse steps (of 2, 1, and 1 min). The PAH solutions and $TiO_2$ dispersions and their respective rinse solutions were adjusted to pH 7.0 and pH 9.0 with either NaOH or HCl respectively.

Glass substrates were first degreased by sonication in a 4% (v/v) solution of Micro-90 cleaner (International Products Co.) for 15 min, subsequently sonicated twice in MQ water for 15 min. The substrates were blow-dried with dry air and treated for 2 min with an oxygen plasma (PDC-32G, Harrick Scientific Products, Inc.) at 150 mTorr before the LbL assembly. After the assembly process, the coated substrate was calcinated for 3 hours at 350° C. This temperature is sufficient to remove the PAH and to sinter the particle together into a nanoporous coating but ensures retaining of the desired $TiO_2$ crystal structure (anatase) that maximizes photocatalytic activity and prevents it from being converted to the rutile structure. Except FIG. 6C, all the experimental results on the properties of nanoporous $TiO_2$ surfaces were presented after calcination.

Artificial Sebum

At room temperature, 16 wt % oleic acid (Sigma-Aldrich, 99%), 12 wt % squalene (Alfa Aesar, 98%), 25 wt % jojoba oil (Sigma-Aldrich), and 41 wt % vegetable oil (Mazola)$_8$ were introduced into a 200 mL glass bottle and then gently mixed using a vortex mixer for 1 hour. This mixture was used as an artificial sebum ($\gamma_{LV}$=33.4±0.7 mN/m, measured by Krüss K10) after storing it at room temperature for 24 hours.

PDMS Post Arrays and Experimental Method

To minimize variability in successive dactylograms, a stamp-based method was constructed for depositing representative micro-droplet arrays of sebum. Polydimethylsiloxane (PDMS) posts were first fabricated using an SU-8 mold. The artificial sebum was spread over the backside of a silicon wafer by spin-coating at 7000 rpm for 60 seconds. The stamp was then pressed against the oil film with a contact force of 4 N and held in contact for 3 seconds. When the stamp was removed, a small amount of artificial sebum remains on the tops of the wetted PDMS posts as shown in the inset of FIG. 7A. After having 'inked' the PDMS posts with artificial sebum, the stamp is first pressed into contact with a cleaned microscope slide (to ensure a uniform sebaceous coating on the microposts), and then used to stamp an array of sebum microdroplets onto the LbL-assembled and calcinated nanoparticle surface using a normal force of 4 N.

Optical Transmissivity and Haze Measurements

A spectrophotometer (Cary-500) was used for spectral transmissivity and haze measurements in the visible range (400 nm≤λ≤800 nm). Haze measurements were performed using the spectrophotometer with an integrating sphere, as described in ASTM D1003 "Standard Method for Haze and Luminous Transmittance of Transparent Plastics." A stabilized diode laser (660 nm) was also used to measure the transmissivity at normal incidence angle.

Digital Image Distortion Analysis

In addition to measuring haze and transmitted intensity, image distortion was monitored using a standard image resolution test target. Following previous publications (see, Lee, H., Alcaraz, M. L., Rubner, M. F. & Cohen, R. E. Zwitter-wettability and antifogging coatings with frost-resisting capabilities. ACS Nano 7, 2172-2185 (2013), and Ching a, G. & Syverud, K. Quantification of paper mass distributions within local picking areas. Nord. Pulp and Paper Res. J. 22, 441-446 (2007), each of which is incorporated by reference in its entirety) two images taken through the nanoporous coating of the identical test target before and after deposition of sebum were digitally cross-correlated through mechanical contact or exposure to a fog stream. The resulting correlation coefficient (0≤α≤1) indicates the level of image distortion with a value of zero representing complete loss of correlation due to blurriness and poor optical clarity, whilst a value of unity corresponds to no image distortion.

Contact Angle Measurements

Advancing contact angle measurements were performed using a Ramé-Hart model 590 goniometer, by dispensing liquid droplets of volume V=5 μL and adding volume to the droplets at the flow rate of 1 μL/s.

Kinetic Friction Coefficient Measurement

In order to measure kinetic friction coefficient between the rubber pad and the $TiO_2$ nanoparticle coating, an inclined plane was utilized. By changing the tilting angle of the $TiO_2$ nanoparticle coated surface, a specific angle (Ψ) was measured at which the rubber pad slides down at a constant speed. The tangent value of the measured specific angle is determined to be the coefficient of kinetic friction between the rubber pad and the $TiO_2$ nanoparticle coating because the friction force and the sine of the gravitational force acting on the rubber pad are the same, and the force normal to the tilted surface is the cosine value of the gravitational force acting on the rubber pad when the rubber pad slides down at a constant speed.

Anti-Bacterial Experiment

*Escherichia coli* (strain K-12-EMG2) was cultured in Luria Broth (LB) to mid-exponential phase, then diluted to OD600=0.1 and exposed to a glass slide or a $TiO_2$ nanoparticle-coated glass slides and incubated at 37° C. for 1 hour. The slides were then washed twice with phosphate buffered saline (PBS) and exposed to UV light (365 nm, intensity I=1.6±0.1 mW/cm$^2$, UVL-28, UVP Inc.), with 3 mL of PBS on the slides for either 1, 2 or 3 hours. The PBS was then removed and bacteria were stained with a live/dead stain (Invitrogen) composed of a 1:1 ratio of SYTO 9 and propidium iodide dyes. After a 20 minute incubation, the cells were observed under fluorescence microscopy using an Observer Z1 inverted fluorescent microscope (Zeiss, Oberkochen, Germany) and a 100×1.4 NA objective (Zeiss, Germany). The proportion of dead bacteria were quantified using ImageJ software (National Institutes of Health) and the particle analyzer plugin.

Porosity of the $TiO_2$ Nanoparticle Coating

To analyze the characteristics of the nanoporous $TiO_2$ coating prepared by Layer by Layer (LbL) coating method, parameters quantifying the capillary imbibition, surface area, and averaged refractive index are important. Because the physical properties of nanoparticles can differ from the bulk properties of the materials the porosity and the refractive index of the thin layer nanoporous coating were calculated using the method proposed by Lee et al. See, Lee, D., Rubner, M. F. & Cohen, R. E. All-nanoparticle thin-film coatings. *Nano Lett.* 6, 2305-2312 (2006), which is incorporated by reference in its entirety. When the refractive index of the nanoparticle ($n_p$) and the porosity of the nanoporous media (p=1−φ, where φ is the packing density of the nanoparticles) are unknown, solving two equations containing two unknowns ($n_p$ and p) is required to determine these values. Effective medium theory can be used to derive an expression for the effective refractive index of a nanoporous thin film deposited on a substrate. See, Choy, T. C. *Effective medium theory: Principles and applications* (Oxford Univ. Press, Oxford, 1999), which is incorporated by reference in its entirety. Measuring the effective refractive indices with two different fluids (of known refractive index) imbibed into the porous nanotexture yields two equations that can then be solved simultaneously to give the pore volume fraction and the refractive index of the nanoparticles. Among various effective medium approximations, Bruggeman's model has been selected, since it matches well with finite difference time domain (FDTD) simulations of random structures. See, Sihvola, A. H. *Electromagnetic mixing formulas and applications* (Institution of Electrical Engineers, 1999), which is incorporated by reference in its entirety. The effective permittivity of the medium ($\varepsilon_{eff}$) is given by solving the following two equations $$(1-\varphi)\frac{\varepsilon_{air}-\varepsilon_{eff}}{\varepsilon_{air}+2\varepsilon_{eff}}+\varphi\frac{\varepsilon_p-\varepsilon_{eff}}{\varepsilon_p+2\varepsilon_{eff}}=0 \quad \text{(eq. 1-1)}$$

$$(1-\varphi)\frac{\varepsilon_{water}-\varepsilon_{eff}}{\varepsilon_{water}+2\varepsilon_{eff}}+\varphi\frac{\varepsilon_p-\varepsilon_{eff}}{\varepsilon_p+2\varepsilon_{eff}}=0 \quad \text{(eq. 1-2)}$$

where $\varepsilon_{air}$ is the permittivity of air, $\varepsilon_{water}$ is the permittivity of water, $\varepsilon_p$ is the permittivity of the particle, and φ is the packing density (i.e. volume fraction) of the particles. In addition, refractive index n is approximately $\sqrt{\varepsilon}$ at optical frequencies for most natural materials.

Figure 10A:
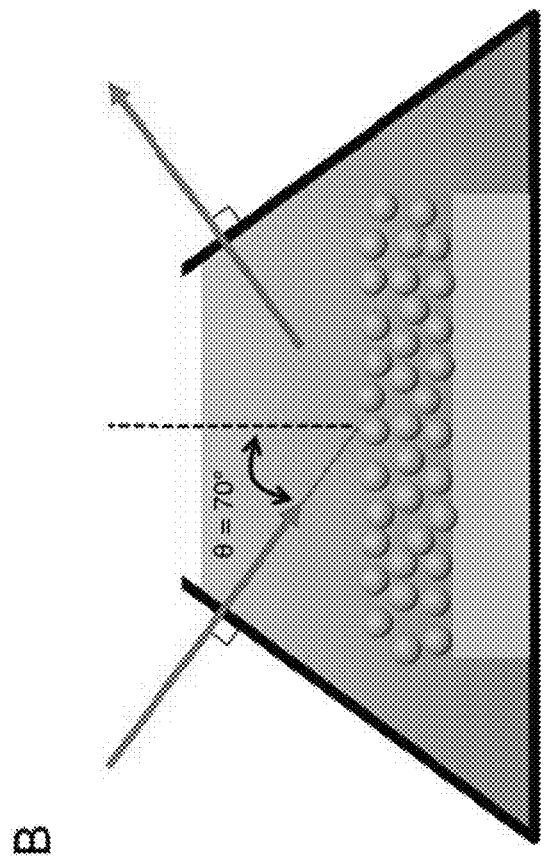
FIG. 10 is a schematic depicting measurements of packing density and refractive index of the nanoparticle thin films in the air (FIG. 10A) and in the water (FIG. 10B) using ellipsometry.
Figure 10B:
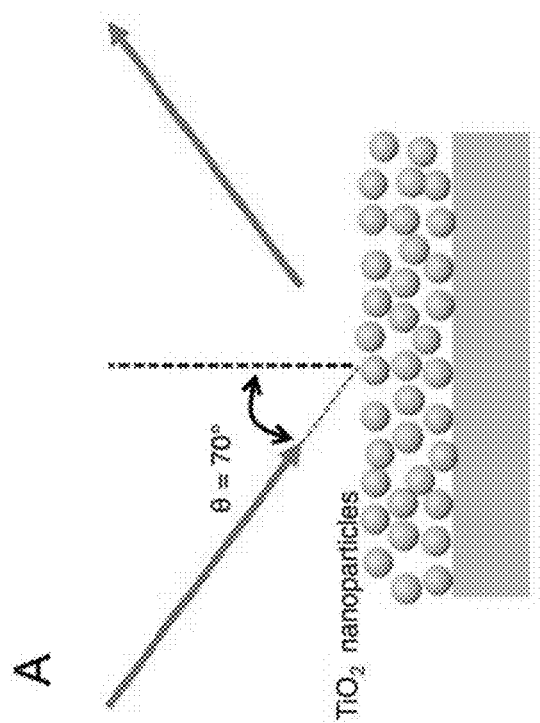

As shown in FIG. 10, the effective refractive indices ($\sqrt{\varepsilon_{eff}}$) measured by ellipsometry (λ=633 nm) are 1.478 (with the air) and 1.633 (with the water). Since the refractive indices of air and water are known and the effective permittivity was measured on the same nanoporous textured film, two unknown values ($\varepsilon_p$ and φ) can subsequently be calculated from eqs. 1-1 and 1-2. The calculated packing density (i.e. volume fraction, φ) of the particle is φ=0.504 (p=0.496), and the refractive index of the $TiO_2$ particle is determined to be $n_p$=2.001 at λ=633 nm.

Figure 11:
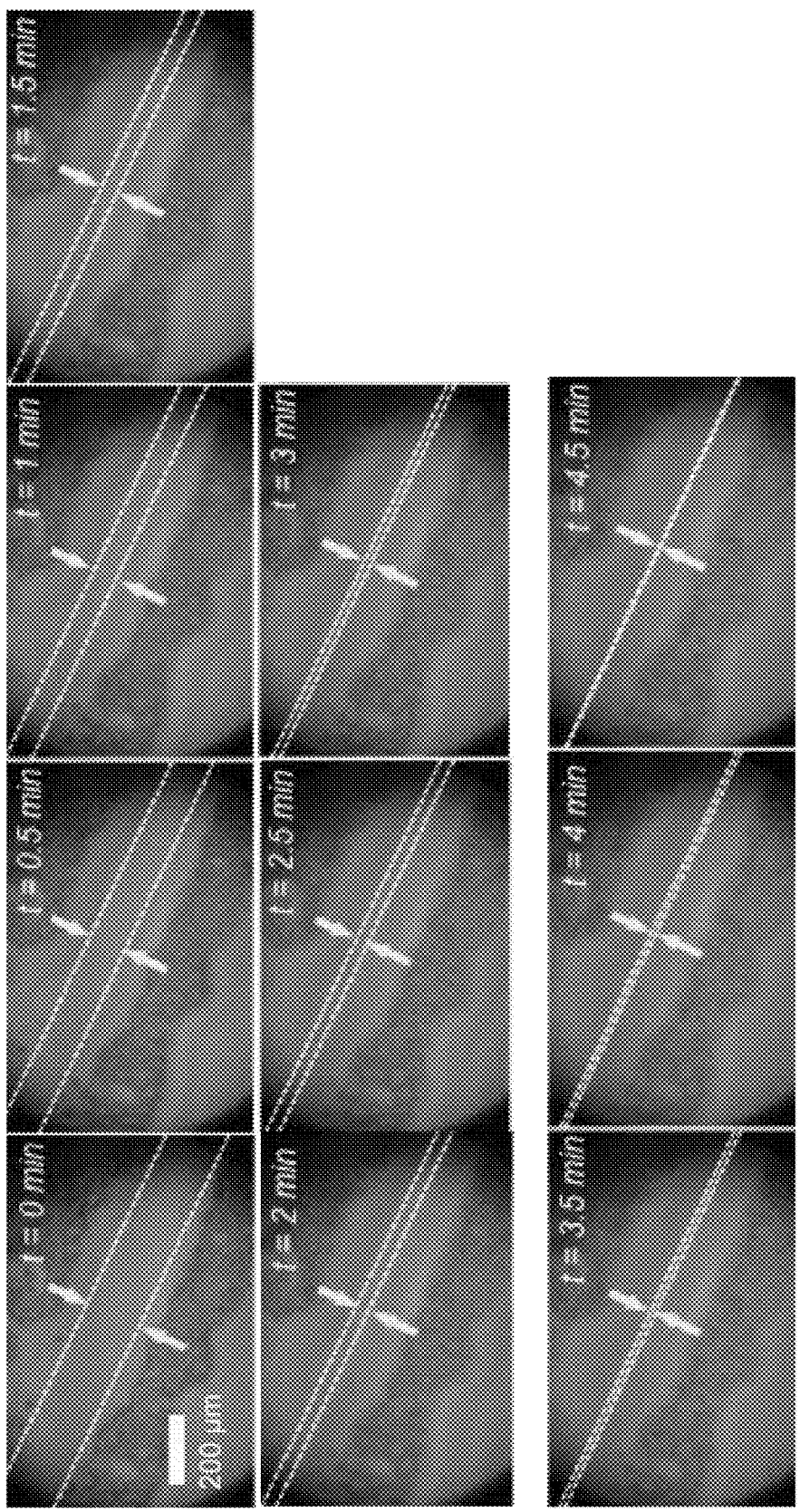
FIG. 11 is sequential microscope images of dactylogram.

Quantification of Lateral Capillary Imbibition of Sebum Over a Thin Porous Layer of Titania Nanoparticles Lateral capillary imbibition of human sebum on the nanoporous and oleophilic titania layer was quantitatively analyzed. This has been designed to minimize the required ultraviolet light exposure time for photocatalytic degradation of a deposited dactylogram. As shown in FIG. 11, as time increases from the moment the dactylogram is deposited (t>0), the two adjacent sebum-air-titania contact lines (denoted by white dotted line, lfront) approach each other due to lateral capillary imbibition. The initially light blue (porous titania) region is progressively filled with light brown color (sebum).

Figure 12:
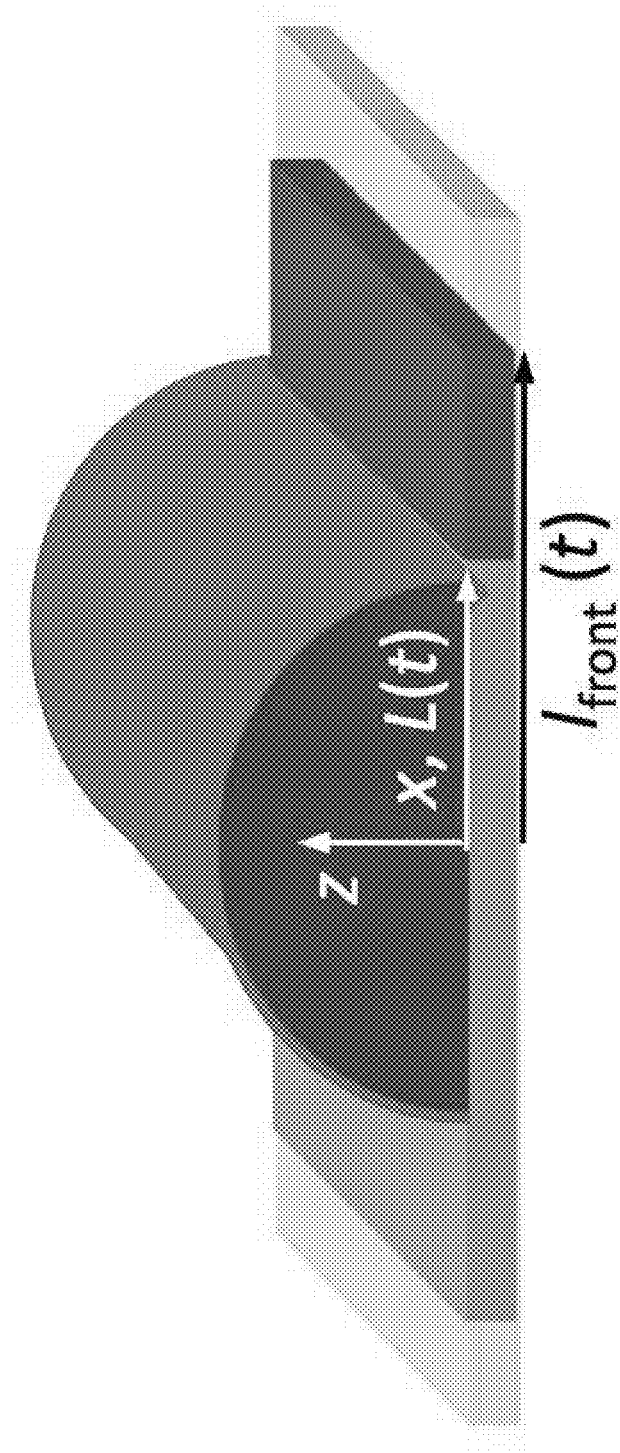
FIG. 12 is a schematic illustration of hemi-cylindrical sebum on a partially wetted thin porous film of titania nanoparticles. The control volume of interest is represented by blue color.

The spreading of a stripe of sebum deposited from a single friction ridge over a thin porous titania film layer can be modeled by considering wicking of a hemi-cylindrical droplet of sebum into a porous substrate (FIG. 12). See, Starov, V. M., Kostvintsev, S. R., Sobolev, V. D., Velarde, M. G. & Zhdanov, S. A. Spreading of liquid drops over dry porous layers: Complete wetting case. *J. Colloid Interface Sci.* 252, 397-408 (2002), which is incorporated by reference in its entirety. To derive the differential equation that describes the time change of position (lfront(t), in the x-direction) of sebum-air-titania interface through the thin porous layer, the volume inside the porous layer and outside the hemi-cylindrical droplet (colored in blue) is considered as a control volume of interest. Because the nanoporous film thickness (dfilm~O(10-1 μm)) is much smaller than the lateral spreading scale (the distance between two adjacent friction ridges is typically O(102 μm), wicking of the sebaceous liquid in the vertical direction (z direction) proceeds much more quickly than laterally; it is thus reasonable to simplify the problem as a quasi one-dimensional spreading problem supplied by a reservoir of fluid as shown in FIG. 12.

Conservation of mass and Darcy's equation governing the motion of liquid through porous media, result in two governing equations, $$\frac{\partial v}{\partial x} = \frac{\partial^2 P}{\partial x^2} = 0 \quad \text{(eq. 2-1)}$$

$$v = -\frac{K_P}{\mu}\frac{\partial P}{\partial x} \quad \text{(eq. 2-2)}$$

where v is the lateral velocity of sebum, $K_P$ is the permeability of the porous layer, μ is the sebum viscosity, and P is the capillary pore pressure inside the porous layer. A solution can be obtained by integrating eqs. 2-1 and 2-2.

$$P = -\frac{A\mu}{K_P}x + B \quad \text{(eq. 2-3)}$$

where A and B are constants of integration and can be determined by considering the following boundary conditions at the entrance and exit of the control volume in the x-direction.

$$P = P_g - P_c \text{ at } x = l_{front}(t) \quad \text{(eq. 2-4)}$$

$$P = P_g - P_d \text{ at } x = L(t) \quad \text{(eq. 2-5)}$$

where $P_g$ is the gaseous pressure, $P_c$ is the capillary pressure at the front of sebum ($x = l_{front}(t)$) inside the porous layer, and $P_d$ is the capillary pressure of the deposited droplet at $x = L(t)$. It should be noted that according to Starov, V. M., Kostvintsev, S. R., Sobolev, V. D., Velarde, M. G. & Zhdanov, S. A. Spreading of liquid drops over dry porous layers: Complete wetting case. *J. Colloid Interface Sci.* 252, 397-408 (2002), which is incorporated by reference in its entirety, the inequality $P_c \gg P_d$ is satisfied since the characteristic radius of curvature inside the porous layer is much smaller than the radius of curvature of the deposited droplet. Therefore, ignoring the value of $P_d$, the following expression for $v|_{x=l_{front}} = dl/dt$ can be derived, $$\frac{dl_{front}}{dt} = \frac{K_P P_c}{\mu}\frac{1}{l_{front} - L} \quad \text{(eq. 2-6)}$$

or $$(l_{front} - L)dl = \frac{K_P P_c}{\mu}dt \quad \text{(eq. 2-7)}$$

From FIG. 11, L(t) can be approximated as a constant because the width of sebum deposited from friction ridge does not change with time ($L(t) = l_0$). By integrating both sides of the eq. 2-7, the equation becomes $$\frac{1}{2}l_{front}^2 - Ll_{front} + C = \frac{K_P P_c}{\mu}t \quad \text{(eq. 2-8)}$$

or $$l_{front} = \left[\frac{2K_P P_c}{\mu}(t - C')\right]^{1/2} + L \quad \text{(eq. 2-9)}$$

where C and C' are unknown constants and $K_P \sim 10^{-18}$ m$^2$, $P_c \sim 5 \times 10^6$ Pa and μ$\sim 10^{-1}$ Pa·s according to order of magnitude values in Starov, V. M., Kostvintsev, S. R., Sobolev, V. D., Velarde, M. G. & Zhdanov, S. A. Spreading of liquid drops over dry porous layers: Complete wetting case. *J. Colloid Interface Sci.* 252, 397-408 (2002), Starov, V. M. & Zhdanov, V. G, Effective viscosity and permeability of porous media. *Colloids Surf A.* 192, 363-375 (2001), and Butcher, E. O. & Coonin, A. The physical properties of human sebum, *J. Invest. Dermatol.* 12, 249-254 (1949), each of which is incorporated by reference in its entirety.

Figure 13:
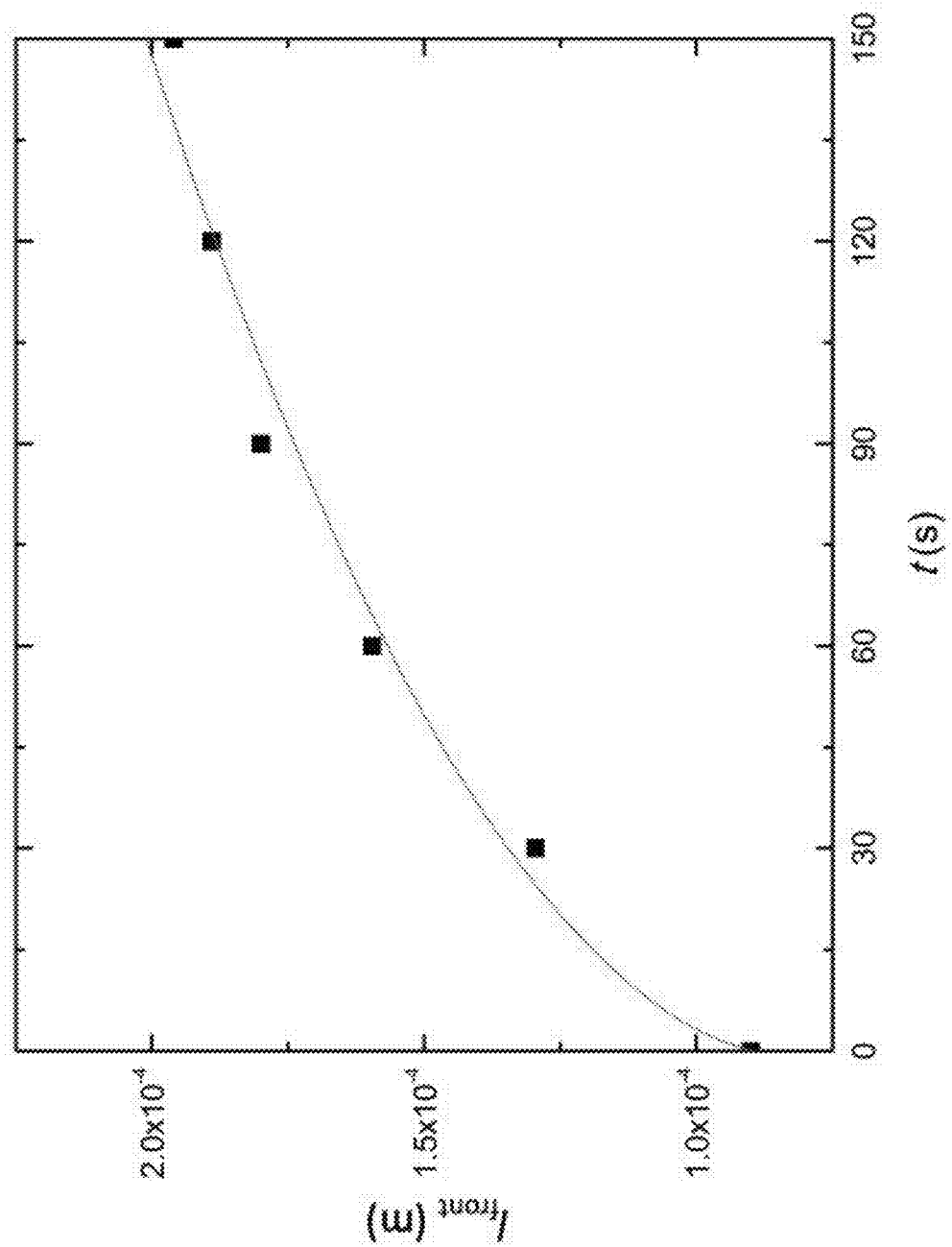
FIG. 13 is a graph depicting the time evolution of the sebum-air-titania contact line position as a result of lateral capillary imbibition.

Finally, the order of magnitude of $2K_P P_c/\mu \sim 10^{-10}$ m$^2$/s in eq. 2-9 was checked by comparing the value determined from curve fitting the experimental data shown in FIG. 13 using the quadratic function $l_{front} = [D(t-E)]^{1/2} + F$ with curve-fitting coefficients D, E, and F. The red solid line represents a result of curve fitting with a quadratic function form $l_{front} = [D(t-E)]^{1/2} + F$ (represented by red solid line). The estimated value based on the first approximation is in good agreement with the value determined from curve-fitting that gives D~9.8×10$^{-11}$ m$^2$/s.

Change in Apparent Contact Angle Upon Ultraviolet (UV) Light Exposure Time

The photocatalytic degradation of the artificial sebum stamped on the TiO$_2$ nanoparticle coating (See Methods for details) can be examined by measuring change of the apparent contact angle of water droplets deposited on the TiO$_2$ nanoparticle coating with respect to UV light exposure time. As shown in Figure S5, the apparent contact angle of a 5 μL droplet deposited on a 50 dipping cycle coating ($d_{50} = 114.8 \pm 6.2$ nm) decreases monotonically as the exposure time increases, and approaches a value below 5° after t=120 minutes, because the intrinsic superhydrophilicity arising from the porosity of the nanoparticle coating is recovered.

Figure 14:
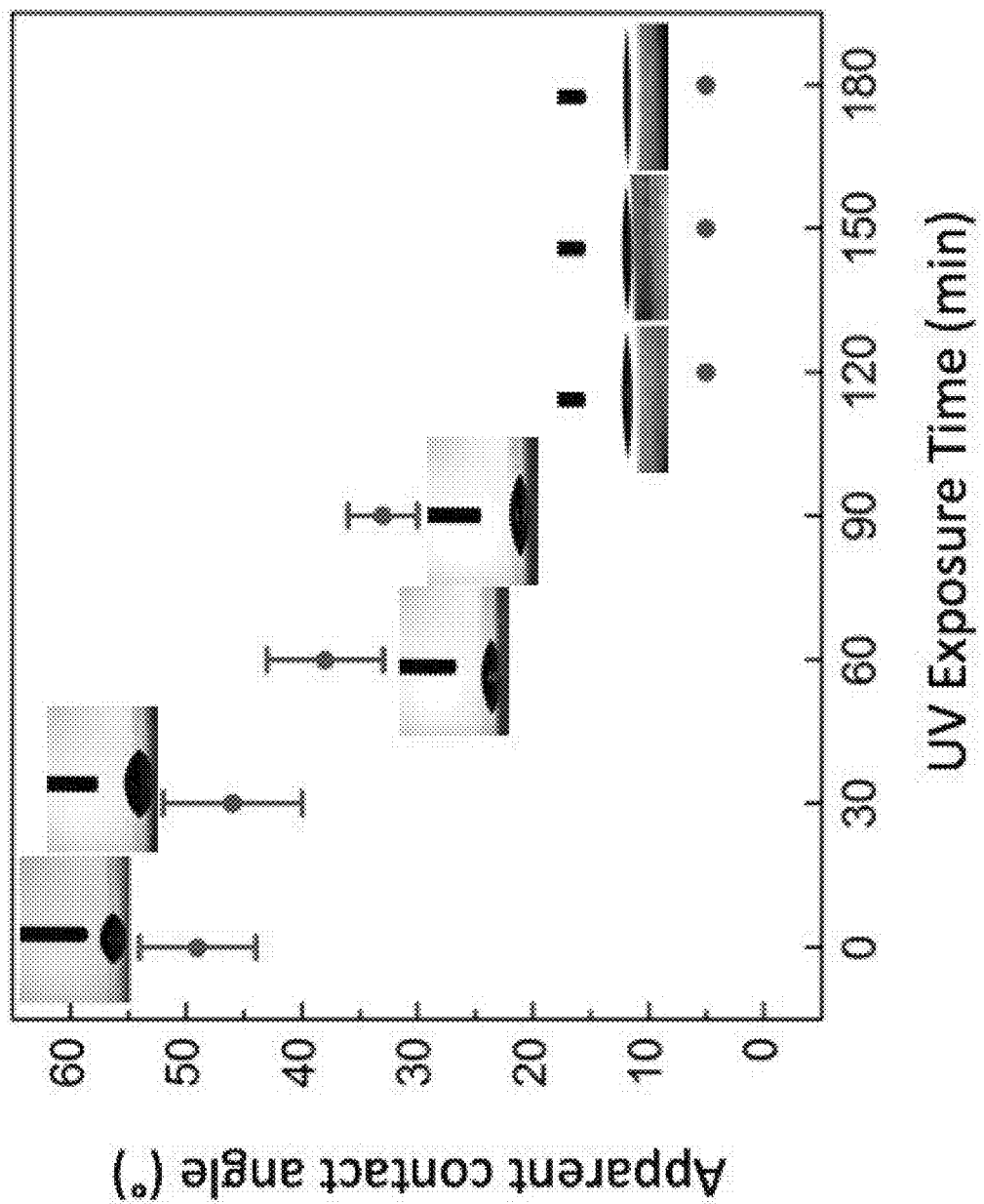
FIG. 14 is a graph depicting time evolution of measured apparent contact angle of water droplets deposited on a 50 dipping cycle coating under UV light exposure.

FIG. 14 shows time evolution of measured apparent contact angle of water droplets (V=5 μL) deposited on a 50 dipping cycle coating under UV light exposure. The apparent contact angle values are reduced to less than 5° after t=120 min demonstrating the recovery of superhydrophilicty of TiO$_2$ nanoparticle surfaces.

Required Exposure Time for Degrading Dactylogram Under Sunlight

In addition to measuring the time required for degradation of stamped artificial sebum under UV light, the required time for degrading human dactylogram was measured under natural sunlight ($I_{solar}$=4±1 mW/cm² at 300 nm<λ<400 nm, T=29±2° C.) to quantify photocatalytic efficacy for practical applications. The results are summarized in Table 2. Combined with information summarized in Table 1 in the manuscript, the appropriate thickness (or number of dipping cycles) can be chosen depending on the required engineering constraints.

TABLE 2

Required exposure time for degrading dactylogram under sunlight

|  | Photocatalytic effect* (N = 3) |
| --- | --- |
| Microscope glass | — |
| 40 dipping cycles | 7 ± 1.1 hours |
| 50 dipping cycles | 3 ± 0.4 hours |
| 60 dipping cycles | 2 ± 0.4 hours |
| 70 dipping cycles | 1.5 ± 0.3 hours |

*Required exposure time was measured by monitoring the elapsed time until the moment that the optical transmissivity through the dactylogram-deposited region reaches 95% of the original transmissivity (i.e. the value without the presence of human sebum) under illumination with sunlight (with average intensity $I_{solar}$ = 4 ± 1 mW/cm² over the range 300 nm < λ < 400 nm).

Figure 15:
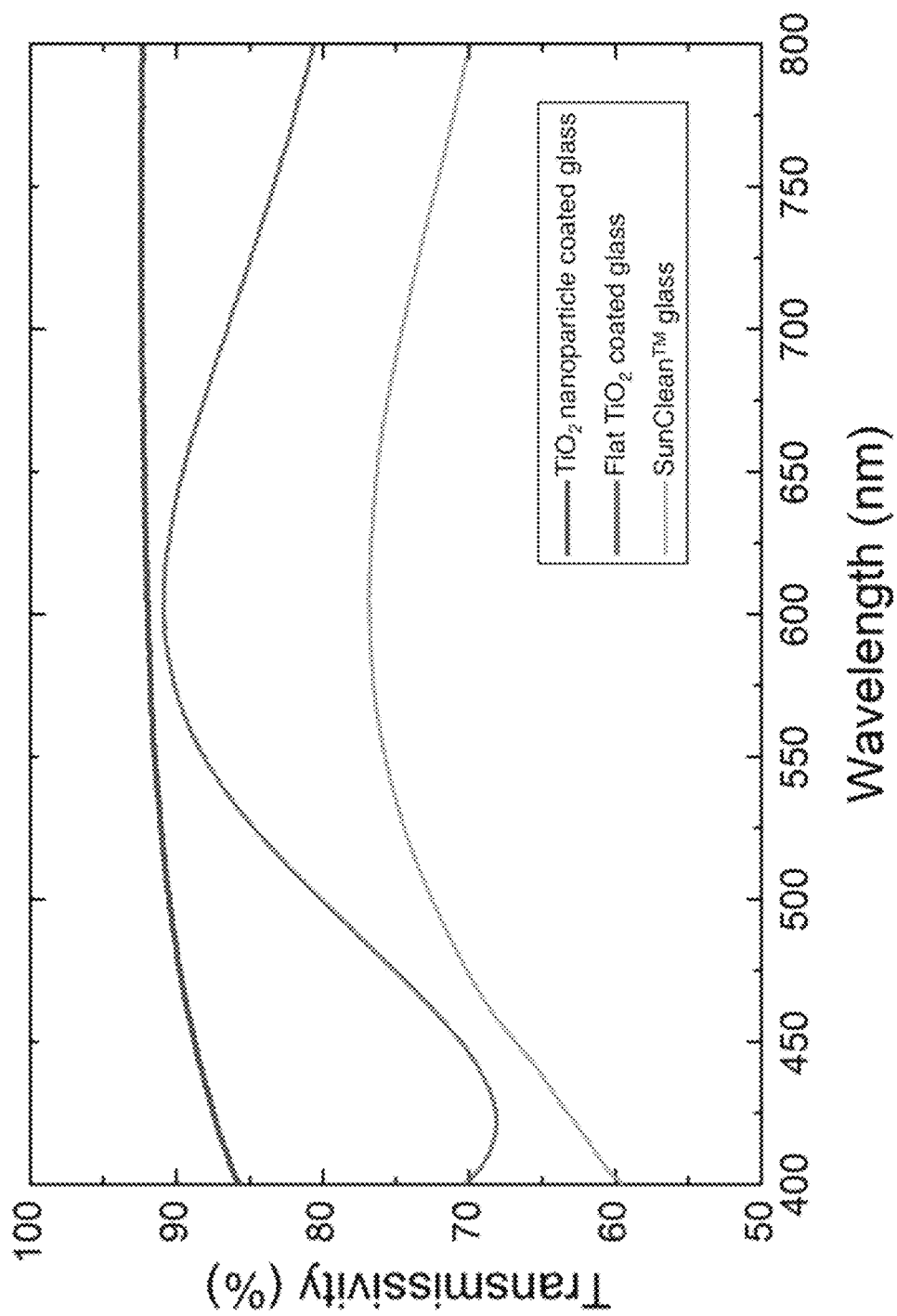
FIG. 15 is a graph depicting measured optical transmissivity over the visible range for three different surfaces.

Optical Transmissivity in the Visible Light Range for the TiO₂ Nanoparticle Coating, a Flat TiO₂ Film Deposited by Using Electron Beam Deposition and SunClean™ Glass The optical transmissivity values over the wavelength range of visible light (400 nm≤λ≤800 nm) for the TiO₂ nanoparticle coating (50 dipping cycle), a flat TiO₂ film, and SunClean™ glass (a commercially available glass coated with TiO₂; see, SunClean Glass—IdeaScapes—PPG Industries, http://www.ppg.com/corporatefideascapes/glass/products/sunclean/pages/suncleanglass.aspx (accessed February 2014), which is incorporated by reference in its entirety) were measured, as shown in FIG. 15. The layered nanoparticle structures with 50 dipping cycles ($d_{50}$=114.8±6.2 nm) have the highest transmissivity over the wavelengths of 400 nm≤λ≤800 nm, compared to the flat TiO₂ film deposited on the microscope slide (thickness=115 nm±10 nm) and SunClean™ glass. FIG. 16A-C show a surface topography of the three kinds of surfaces (oblique views, tilting angle=70°). All scale bars represent 200 nm.

Time Evolution of Measured Transmissivity Through an Artificial Sebum-Stamped Spot of a 50 dipping Cycle Thick TiO₂ Nanoparticle Coating a Flat TiO₂ Film Deposited on a Microscope Slide, and SunClean™ Glass Exposed to UV Light.

Figure 17:
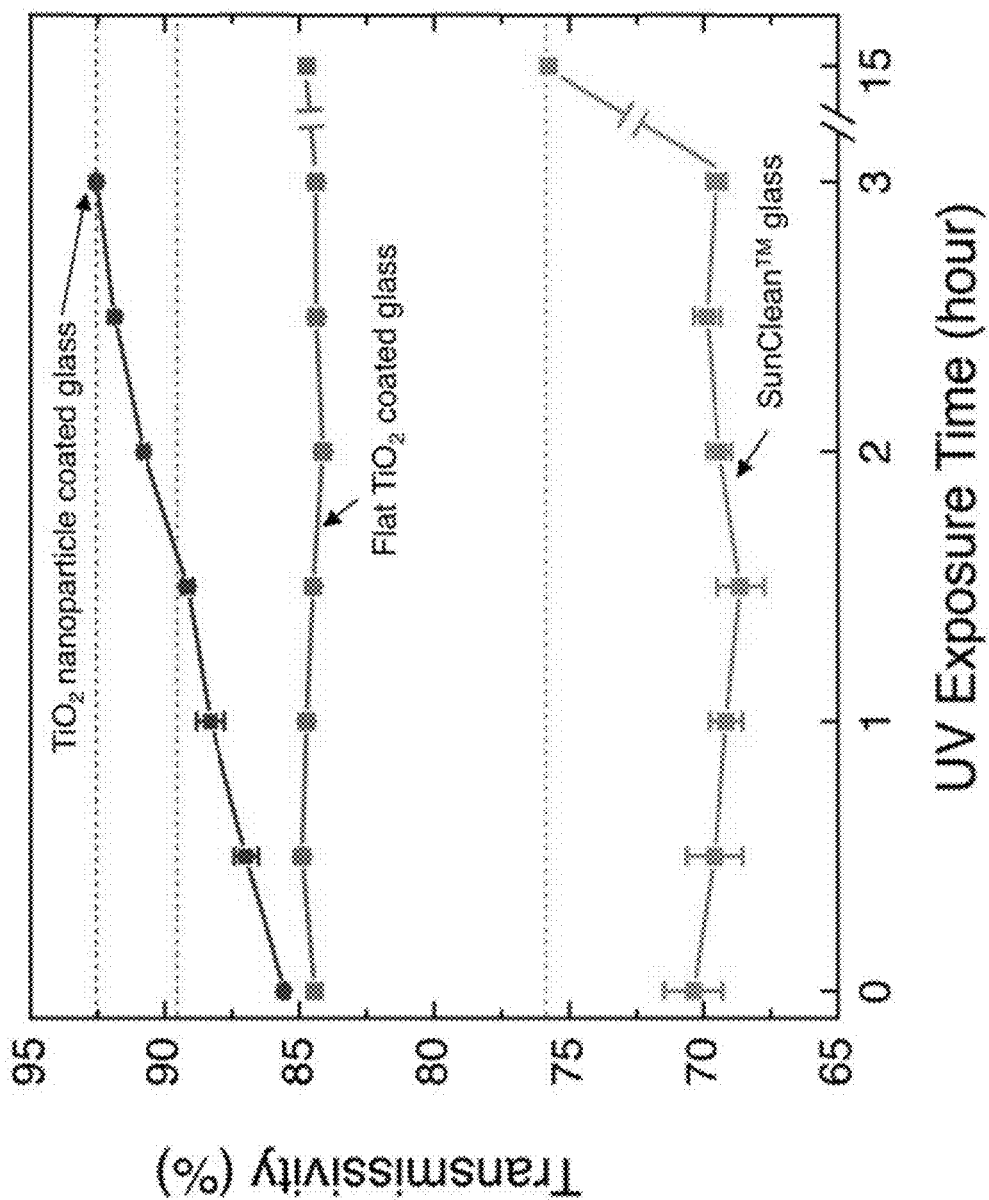
FIG. 17 is a graph depicting time evolution of measured transmissivity.

FIG. 17 shows the measured transmissivity of monochromatic light (incident angle=0°, λ=660 nm from a diode laser) for a 50 dipping cycle film ($d_{50}$=114.8±6.2 nm), a flat TiO₂ film, and SunClean™ glass with respect to UV exposure time after deposition of stamped artificial sebum. The dotted lines represent the initial, sebum-free transmissivity values. All the transmissivity values initially drop from the initial sebum-free values represented by the dotted lines, due to the stamped artificial sebum. As the nanoparticle coated surface is exposed to UV light (1.5±0.1 mW/cm² at 300 nm<λ<400 nm) the transmissivity gradually recovers to its initial sebum-free value within 3 hours. In contrast, optical transmissivity values for the flat TiO₂ film and SunClean™ glass did not reach the sebum-free values within 15 hours because the artificial oils on both coatings were not completely degraded photocatalytically. The required UV light exposure time until the moment that the optical transmissivity through the artificial sebum-deposited region reaches 99% of the original transmissivity was also measured. The required UV light exposure time for the 50 dipping cycle porous TiO₂ nanoparticle coating and SunClean™ glass are 2.5 hours and 15 hours, respectively. In addition, the flat TiO₂ coating did not show any noticeable changes in transmissivity even after 24 hours of UV light exposure.

Mechanical Robustness Test Results of the TiO₂ Nanoparticle Coating Against Repeated Shear Force The mechanical durability of the nanoporous TiO₂ coatings (50 dipping cycles) constructed from calcinated TiO₂ nanoparticles against shear force was tested in consideration of applications such as touch screens. Equivalent shear forces in the range of the human finger shear forces measured on capacitive touchscreens (FIG. 18A) were applied onto the TiO₂ nanotextured coatings by sliding different magnitudes of normal load. See, Meyer, D. J., Peshkin, M. A. & Colgate, J. E. Fingertip friction modulation due to electrostatic attraction, *World Haptics Conference (WHC)*, 43-48 (2013), which is incorporated by reference in its entirety.

Figure 18A:
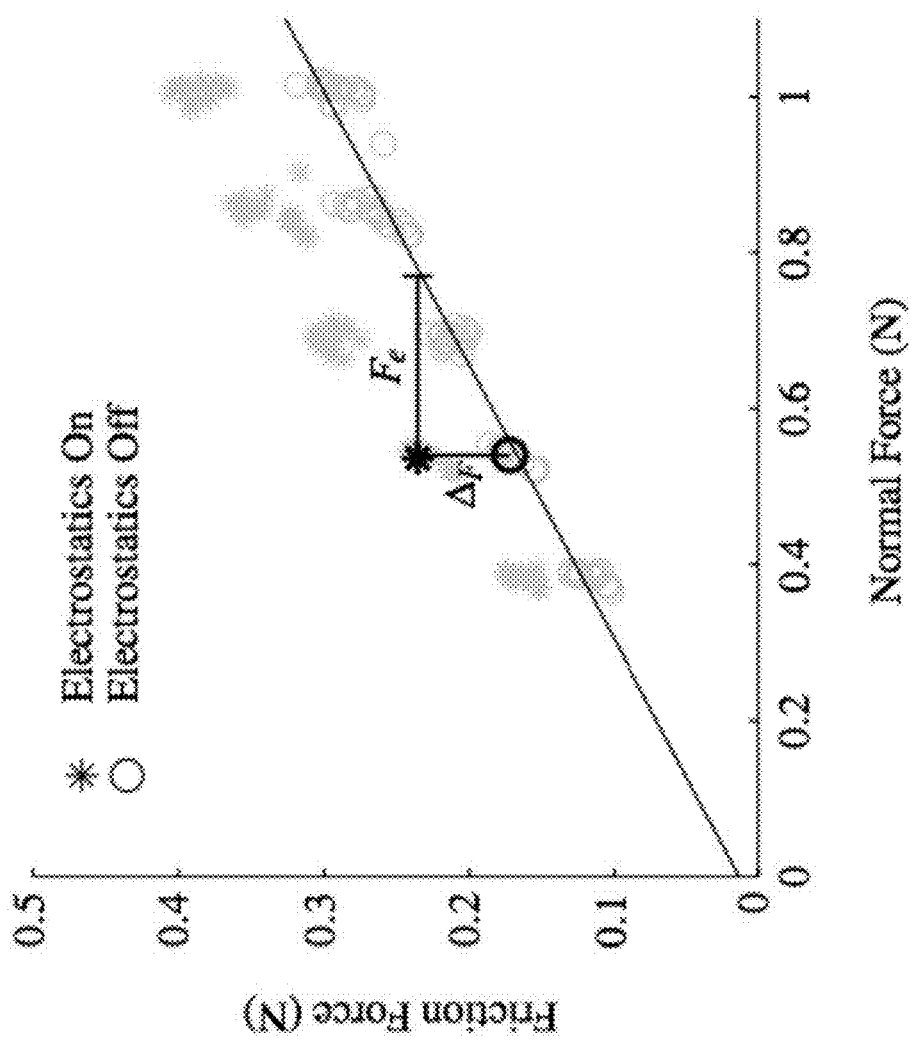
FIG. 18A is a graph depicting averaged human finger touch force on capacitive touchscreens with or without electrostatic force.

FIG. 18A shows a plot of averaged human finger touch force on capacitive touchscreens with or without electrostatic force $F_e$. The standard error is 0.01 N. Reproduced from Reference 8 with the permission of IEEE 2013.

In order to measure kinetic friction coefficient between the rubber pad and the TiO₂ nanoparticle coating, an inclined plane was utilized. By changing the tilting angle of the TiO₂ nanoparticle coated surface, a specific angle (Ψ) was measured at which the rubber pad slides down at a constant speed. The tangent value of the measured specific angle is determined to be the coefficient of kinetic friction between the rubber pad and the TiO₂ nanoparticle coating because the friction force and the sine of the gravitational force acting on the rubber pad are the same, and the force normal to the tilted surface is the cosine value of the gravitational force acting on the rubber pad when the rubber pad slides down at a constant speed.

Figure 18B:
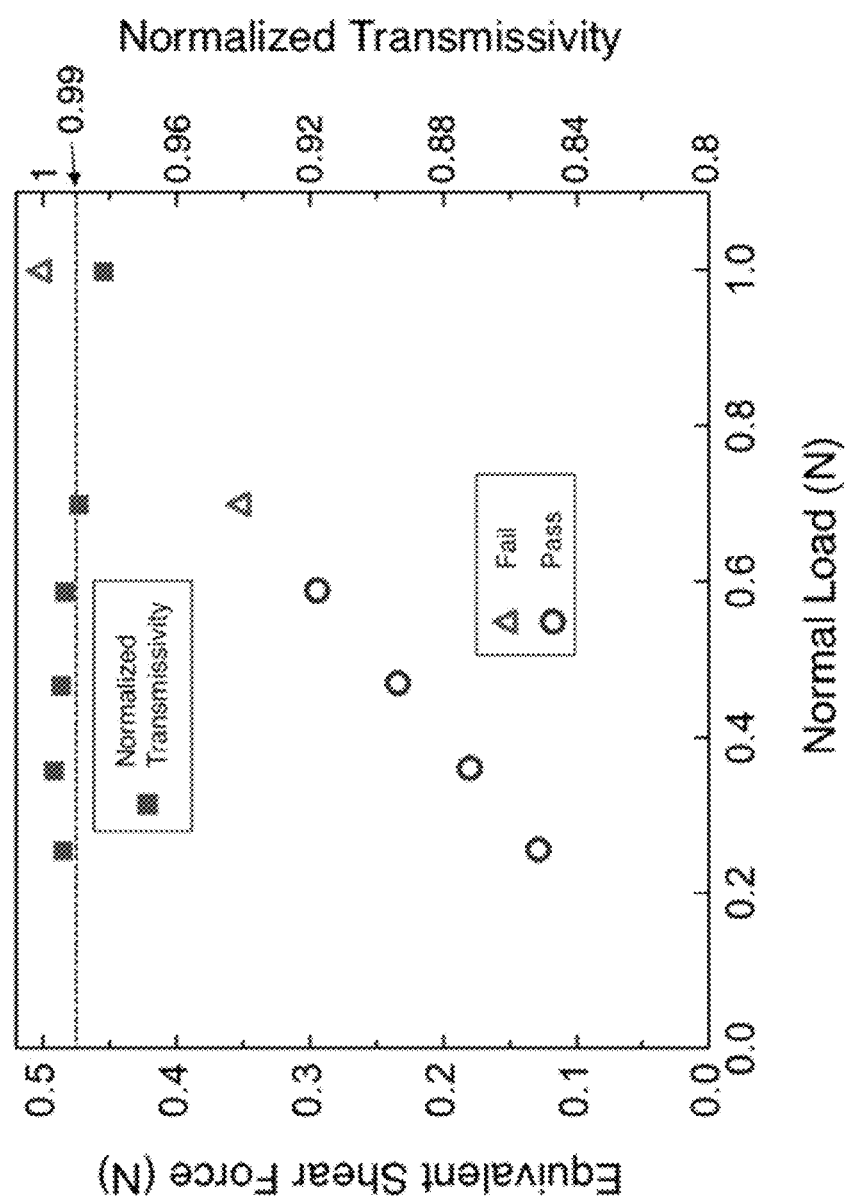
FIG. 18B is a graph depicting estimated shear force with pass (represented as blue hollow circles) or failure (represented as red hollow triangles) results of the shear resistance test.

FIG. 18B shows a plot of estimated shear force with pass (represented as blue hollow circles) or failure (represented as red hollow triangles) results of the shear resistance test. Evolution of optical transmissivity (at λ=660 nm) was measured after applying different shear force on the nanoporous TiO₂ surface through a latex rubber pad with area A=81 mm² (See FIG. 8B caption for details of shear resistance tests). If transmissivity of the nanoporous TiO₂ coating after 50 times of tests with the magnitude of given shear force shows more than 99% of the initial transmissivity value, the result was marked as pass. The green solid squares represent normalized transmissivity values to initial transmissivity of the nanoporous TiO₂ values after 50 times of shear force tests.

As shown in FIG. 18B, the TiO₂ nanoparticle coating shows approximately no change (<1%) from the initial optical transmissivity, even after 50 times repeated contact sliding test with the maximum shear force value of 0.3 N. It should be noted that 0.3 N covers most of the range of measured friction shear force without electrostatic force.

Figure 19:
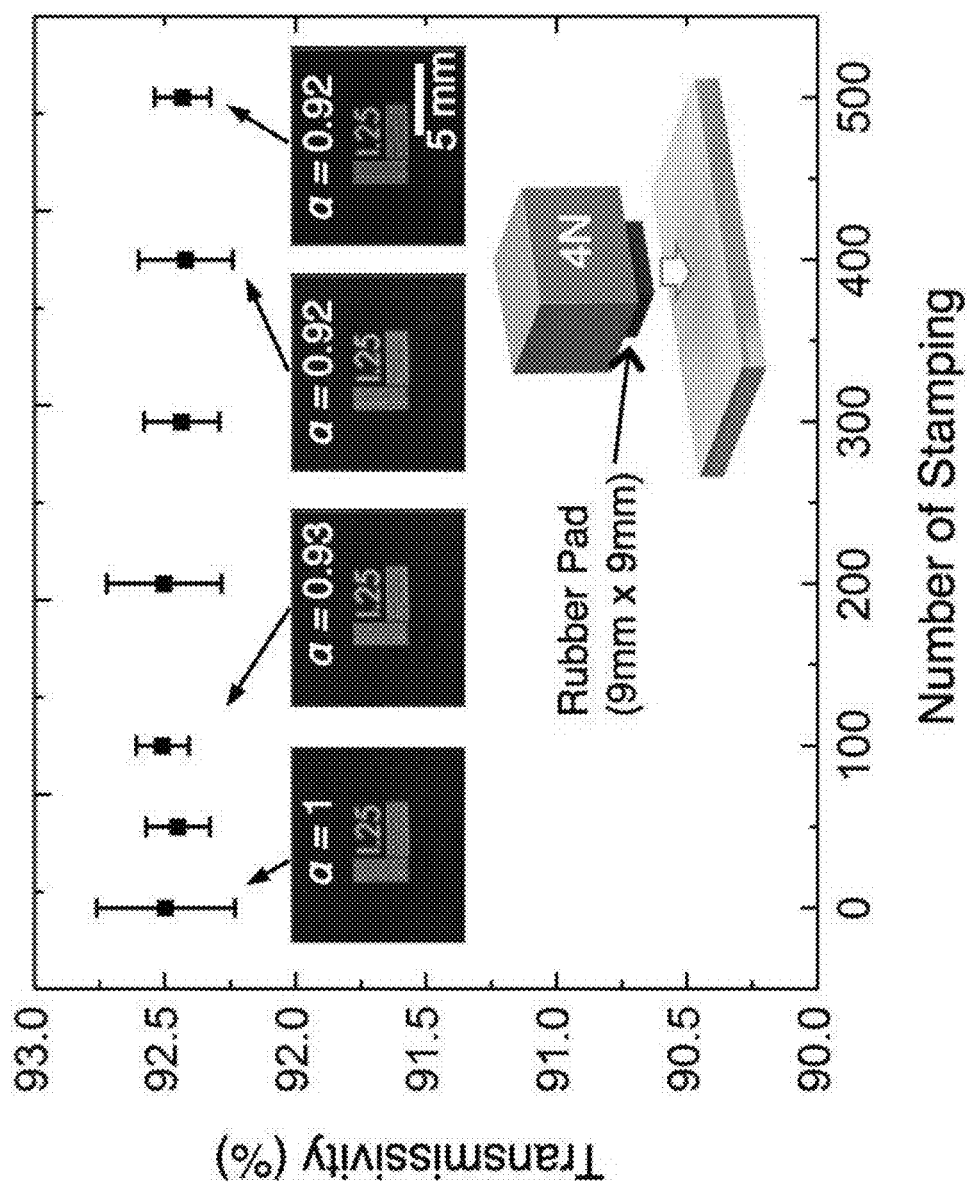
FIG. 19 shows evolution of optical transmissivity after repeatedly applying a normal contact force on the dactylovorous surface.

Mechanical Robustness Test Results of the TiO₂ Nanoparticle Coating Against Repeated Tapping Force The mechanical robustness of the nanostructured coatings (50 dipping cycles) constructed from calcinated TiO₂ nanoparticles against normal force was also tested. A tapping force of 4 N (equivalent to a contact pressure of 49 kPa, representative of a typical finger stroke pressure see, Mascaro, S. A. & Asada, H. H. Measurement of finger posture and three-axis fingertip touch force using fingernail sensors. *IEEE Trans. Robot. Automat.* 20, 26-35 (2004), and Parlitz, D., Peschel, T. & Altenmuller, E. Assessment of dynamic finger forces in pianists: Effects of training and expertise. *J. Biomech.* 31, 1063-1067 (1998), each of which is incorporated by reference in its entirety) was repeatedly applied normal to the nanotextured surface through a latex rubber pad (9 mm by 9 mm). FIG. 19 shows evolution of optical transmissivity (at λ=660 nm) after repeatedly applying a normal contact force (4 N) on the dactylovorous surface through a latex rubber pad with area A=81 mm². The four insets are images of the resolution test chart (with image quality greater than α=0.92) taken through the LbL-deposited nanoparticle surfaces after repeated mechanical loading (see Methods for details of digital image distortion analysis) t FIG. 19 shows that there is no drop in optical transmissivity after repeated contact loading of up to 500 times. Image distortion analysis using a standard resolution test target is used to quantify the mechanical durability in a different way. See, Lee, H., Alcaraz, M. L., Rubner, M. F. & Cohen, R. E. Zwitter-wettability and antifogging coatings with frost-resisting capabilities. *ACS Nano* 7, 2172-2185 (2013), and Ching a, G. & Syverud, K. Quantification of paper mass distributions within local picking areas. *Nord. Pulp and Paper Res. J.* 22, 441-446 (2007), each of which is incorporated by reference in its entirety. The correlation coefficient ($0 \leq \alpha \leq 1$) indicates the level of image distortion due to repeated contact loading, compared to a reference image that is a part of the resolution test chart viewed through the nanoparticle coated surfaces. The value of zero represents no correlation between the two images due to poor optical clarity whilst the value of unity means complete matching among the images. The four insets of FIG. 19 illustrate sharp in-focus images of the resolution test chart (with image quality greater than α=0.92) taken through the LbL-deposited nanoparticle surfaces after repeated contact loadings.

Soot-Cleaning Effect

Figure 20:
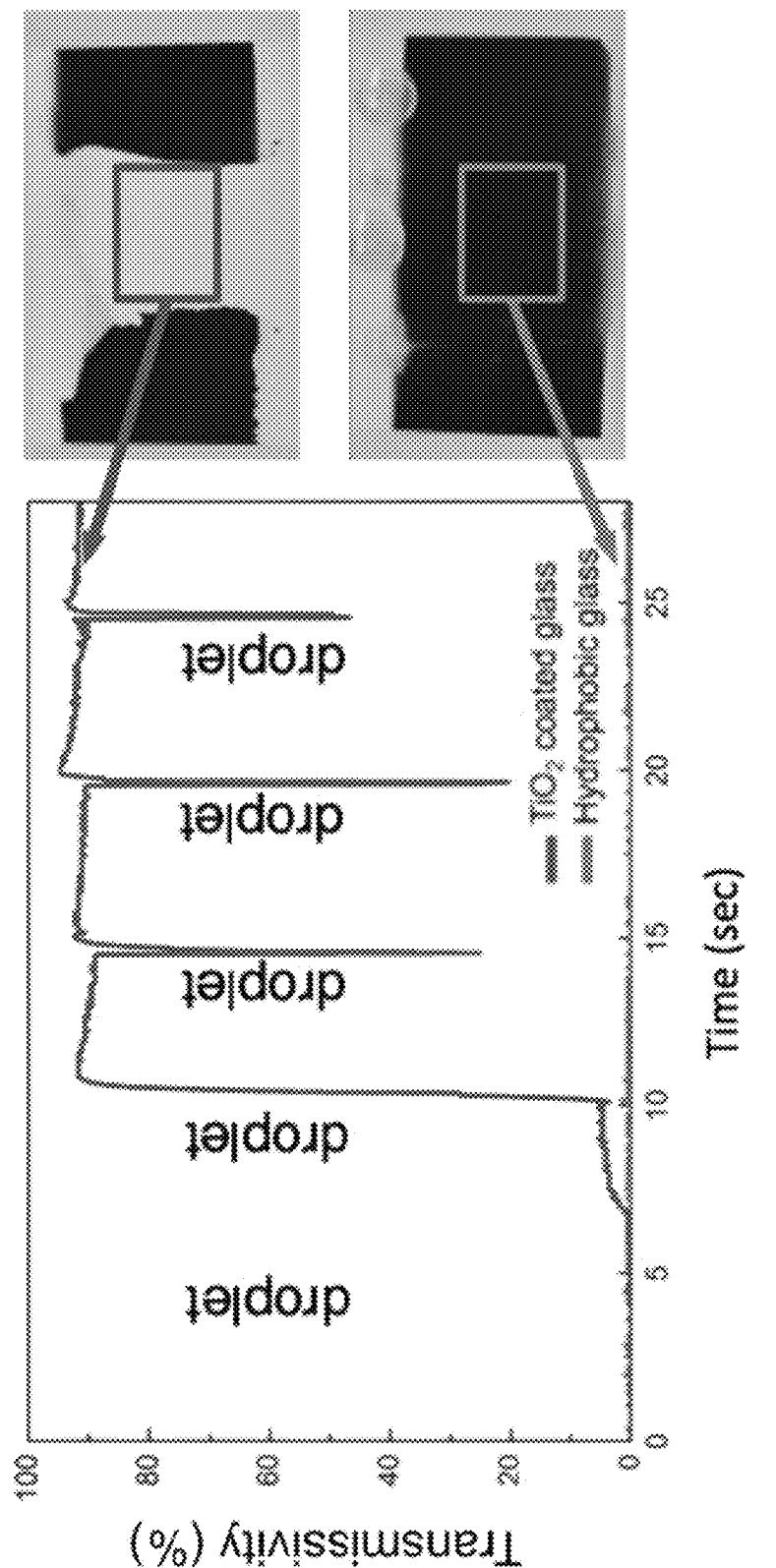
FIG. 20 shows evolution of the transmissivity of 660 nm red laser through the nanoparticle-deposited surface and flat hydrophobic glass surface.

The self-cleaning properties of the nanoporous $TiO_2$ surfaces (50 dipping cycles) against particulate deposition using flame-deposited soot are shown in FIG. 20. Photocatalytic mineralization reactions lead to rapid weakening of the adhesion of the carbonaceous particles deposited on the $TiO_2$ surfaces so that soot deposits can be readily washed off the surface with a few drops of water. See, Mills, A., Wang, J., Crow, M. Photocatalytic oxidation of soot by P25 $TiO_2$ films. *Chemosphere* 64, 1032-1035 (2006), which is incorporated by reference in its entirety. FIG. 20 shows evolution of the transmissivity of 660 nm red laser through the nanoparticle-deposited surface (blue color, corresponding to the top right image) and flat hydrophobic glass surface (red color, corresponding to the bottom right image), respectively. The transmissivity measurements were recorded while water droplets were released from a height of 50 mm (corresponding to impact velocity V=0.99 m/s; and a Weber number of $We = \rho U_0^2 D_0 / \gamma \square 0$ 36.8, where ρ is the density of water, $U_0$ is the impacting velocity, $D_0$ is the diameter of droplet before impact, and γ is the surface tension of water) onto surfaces inclined at 30° every 5 seconds starting at t=5 sec.

Other embodiments are within the scope of the following claims.

What is claimed is:

1. A structure comprising:
   a transparent substrate; and
   a multi-layer optically transmissive nanoparticle structure residing on the substrate comprising an outermost layer of titanium dioxide nanoparticles wherein the outermost layer of titanium dioxide nanoparticles of the multi-layer structure is superhydrophilic and oleophilic, and alternating layers of low and high index of refraction materials below the outermost layer to provide broadband anti-reflectivity
   wherein the alternating layers of low and high index of refraction materials form a nanoporous coating and have a smaller refractive index than the substrate and
   the optically transmissive nanoparticle structure capable of wicking sebum into the nanoporous coating of the nanoparticle structure followed by photocatalytic degradation.

2. The structure of claim 1, wherein the outermost layer of titanium dioxide nanoparticle is porous.

3. The structure of claim 1, wherein the multi-layer structure comprises material selected from the group consisting of silicon dioxide, titanium dioxide, silicon, metallic glass, polymer, metal, or combinations thereof to provide a selected functionality.

4. The structure of claim 3, wherein the selected functionality is anti-reflectivity, anti-fogging, anti-scratch, or anti-bacterial.

5. The structure of claim 1, wherein the substrate is flexible.

6. The structure of claim 1, wherein the nanoparticle size and thickness of the multi-layer structure are selected to maximize a photocatalytic effect and to minimize light scattering.

7. The structure of claim 1, wherein an oil deposition on the outermost layer of titanium dioxide nanoparticles of the structure is degraded after exposure to sunlight.

8. The structure of claim 7, wherein the oil deposition is degraded within 3 hours of exposure to sunlight.

9. The structure of claim 1, wherein an oil deposition on the outer most layer of titanium dioxide nanoparticles of the structure is degraded after exposure to UV light.

10. The structure of claim 9, wherein the oil deposition is degraded within 3 hours of exposure to sunlight.

11. The structure of claim 1, wherein the size of the titanium dioxide nanoparticles is less than 1 nm.

* * * * *